United States Patent
Swartzentruber

(10) Patent No.: US 9,755,983 B1
(45) Date of Patent: Sep. 5, 2017

(54) MINIPACKET FLOW CONTROL

(71) Applicant: Netronome Systems, Inc., Santa Clara, CA (US)

(72) Inventor: Ron Lamar Swartzentruber, Amesbury, MA (US)

(73) Assignee: Netronome Systems, Inc., Santa Clara, CA (US)

( * ) Notice: Subject to any disclaimer, the term of this patent is extended or adjusted under 35 U.S.C. 154(b) by 428 days.

(21) Appl. No.: 14/521,435

(22) Filed: Oct. 22, 2014

(51) Int. Cl.
*H04L 12/801* (2013.01)

(52) U.S. Cl.
CPC .................. *H04L 47/39* (2013.01)

(58) Field of Classification Search
CPC .................. H04L 47/39; H04L 45/00
See application file for complete search history.

(56) References Cited

U.S. PATENT DOCUMENTS

| | | | |
|---|---|---|---|
| 2013/0051397 A1* | 2/2013 | Guo | H04L 45/00 370/400 |
| 2013/0215792 A1* | 8/2013 | Stark | H04L 49/15 370/257 |

* cited by examiner

*Primary Examiner* — Siming Liu
(74) *Attorney, Agent, or Firm* — Imperium Patent Works LLP; T. Lester Wallace; Mark D. Marrello

(57) ABSTRACT

An apparatus and method for providing minipacket flow control. A device includes a traffic manager interface (TMI) circuit that receives a minipacket, communicates the minipacket to a physical layer circuit, and communicates a minipacket flow control signal to a scheduler circuit that controls if another minipacket is to be sent to the TMI circuit. In one example, upon receiving a minipacket the TMI circuit updates a current credit value, compares the current credit value with a credit limit value, and outputs a minipacket flow control signal that is a function of the comparison. In another example, upon receiving a minipacket the TMI circuit updates a current credit value, compares the current credit value with a credit limit value, reads and compares a credit pool value with a credit pool limit value, and outputs a minipacket flow control signal that is a function of both of the comparisons.

18 Claims, 18 Drawing Sheets

METHOD OF MANAGING MINIPACKET TRAFFIC FLOW

MPLS ROUTER

MAC ISLAND
(INGRESS)

TRANSFERRED OVER MINIPACKET BUS

NBI ISLAND
(INGRESS)

| WIDTH | DESCRIPTION |
|---|---|
| 6-BITS | BUFFER POOL NUMBER TO USE |
| 32-BITS | SEQUENCE NUMBER IN A FLOW (USABLE TO ORDER PACKETS TO BE SENT OUT IB-NFP) |
| ~100-BITS | USER METADATA (A CODE INDICATIVE OF PACKET TYPE)<br>- ONE BIT INDICATES WHETHER THE PACKET IS AN EXCEPTION PACKET OR A FAST PATH PACKET |

PRECLASSIFICATION RESULTS

| WIDTH | DESCRIPTION |
|---|---|
| 32-BITS | ADDRESS INFO INDICATING WHERE THE HEADER PORTION IS STORED. |
| 32-BITS | ADDRESS INFO INDICATING WHERE THE PAYLOAD PORTION IS STORED. |
| 16-BITS | PACKET LENGTH. |
| 32-BITS | SEQUENCE NUMBER OF THE PACKET. |
| ~100-BITS | USER METADATA (A CODE INDICATIVE OF PACKET TYPE)<br>- ONE BIT INDICATES WHETHER THE PACKET IS AN EXCEPTION PACKET OR A FAST PATH PACKET |

INGRESS PACKET DESCRIPTOR

FIG. 7

| WIDTH | DESCRIPTION |
|---|---|
| 32-BITS | ADDRESS INFO INDICATING WHERE THE HEADER PORTION IS STORED. |
| 32-BITS | ADDRESS INFO INDICATING WHERE THE PAYLOAD PORTION IS STORED. |
| 16-BITS | PACKET LENGTH. |
| 32-BITS | SEQUENCE NUMBER OF THE PACKET. |
| 16-BITS | QUEUE NUMBER: QUEUE TO WHICH THE PACKET BELONGS. ("QUEUE INDICATOR") |
| 8-BITS | I/O DESTINATION TO WHICH THE PACKET IS TO BE SENT. |
| 5-BITS | PACKET SEQUENCER IDENTIFICATION |
| 3-BITS | DROP PRECEDENCE VALUE |
| 1-BITS | PRIORITY INDICATOR (INDICATES IF PACKETS CAN BE DROPPED - OPTIONAL) |

EGRESS PACKET DESCRIPTOR

FIG. 8

ME ISLAND

MU ISLAND

NBI ISLAND
(EGRESS)

TRAFFIC MANAGER INTERFACE

CREDIT COUNTER CIRCUIT

TRAFFIC MANAGER INTERFACE WITH CREDIT POOL

CREDIT COUNTER CIRCUIT

MAC ISLAND
(EGRESS)

PACKET FLOW WHEN LOCAL MEMORY
RESOURCES ARE AVAILABLE

PACKET FLOW WHEN LOCAL MEMORY
RESOURCES ARE SCARCE

METHOD OF MANAGING MINIPACKET TRAFFIC FLOW

METHOD OF MANAGING MINIPACKET TRAFFIC FLOW USING A
BYTE COUNTER

METHOD OF MANAGING MINIPACKET TRAFFIC FLOW USING A CREDIT POOL

//MINIPACKET FLOW CONTROL

TECHNICAL FIELD

The described embodiments relate generally to transmitting minipackets and more specifically to transmitting minipackets within the network flow processor using a credit based system.

SUMMARY

In a first novel aspect, a device includes a scheduler circuit that schedules a packet for transmission and a traffic manager interface circuit that receives a minipacket and communicates the minipacket to a physical network interface circuit. The traffic manager interface circuit includes a channel router that receives the minipacket and outputs the minipacket onto one of a plurality of channels. The traffic manager interface circuit also includes a channel credit manager that updates a current credit counter value associated with the first channel, determines if an additional minipacket is allowed to be transmitted on the first channel, and outputs a first minipacket flow control signal.

In a second novel aspect, a device causes a minipacket to be routed to one of a plurality of channels, updates a current credit counter value associated with the first channel in response to receiving the minipacket, compares the current credit counter value with a credit limit value, outputs a minipacket flow control signal indicating that an additional minipacket is allowed to be transmitted via the first channel when the current credit counter value is greater than the credit limit value, and outputs a minipacket flow control signal indicating that an additional minipacket is not allowed to be transmitted via the first channel when the current credit counter value is not greater than the credit limit value.

In a third novel aspect, a device receives a minipacket onto one of a plurality of channels, updates a current credit value associated with the first channel in response to receiving the minipacket, reads a credit limit value, a credit pool value, and a credit pool limit, compares the current credit value with a credit limit value, compares the credit pool value with the credit pool limit, outputs a minipacket flow control signal indicating that an additional minipacket is allowed to be transmitted via the first channel when either: (i) the current credit value is greater than the credit limit value, or (ii) the credit pool value is greater than the credit pool limit, and outputs a minipacket flow control signal indicating that an additional minipacket is not allowed to be transmitted via the first channel when both (i) the current credit value is not greater than the credit limit value, and (ii) the credit pool value is current t greater than the credit pool limit.

Further details and embodiments and techniques are described in the detailed description below. This summary does not purport to define the invention. The invention is defined by the claims.

BRIEF DESCRIPTION OF THE DRAWINGS

The accompanying drawings, where like numerals indicate like components, illustrate embodiments of the invention.

FIG. 7 is a table that sets forth the parts of an ingress packet descriptor.

FIG. 8 is a table that sets forth the parts of an egress packet descriptor.

DETAILED DESCRIPTION

Reference will now be made in detail to background examples and some embodiments of the invention, examples of which are illustrated in the accompanying drawings. In the description and claims below, relational terms such as "horizontal", "vertical", "lateral", "top", "upper", "bottom", "lower", "right", "left", "over" and "under" may be used to describe relative orientations between different parts of a structure being described, and it is to be understood that the overall structure being described can actually be oriented in any way in three-dimensional space.

Figure 1:
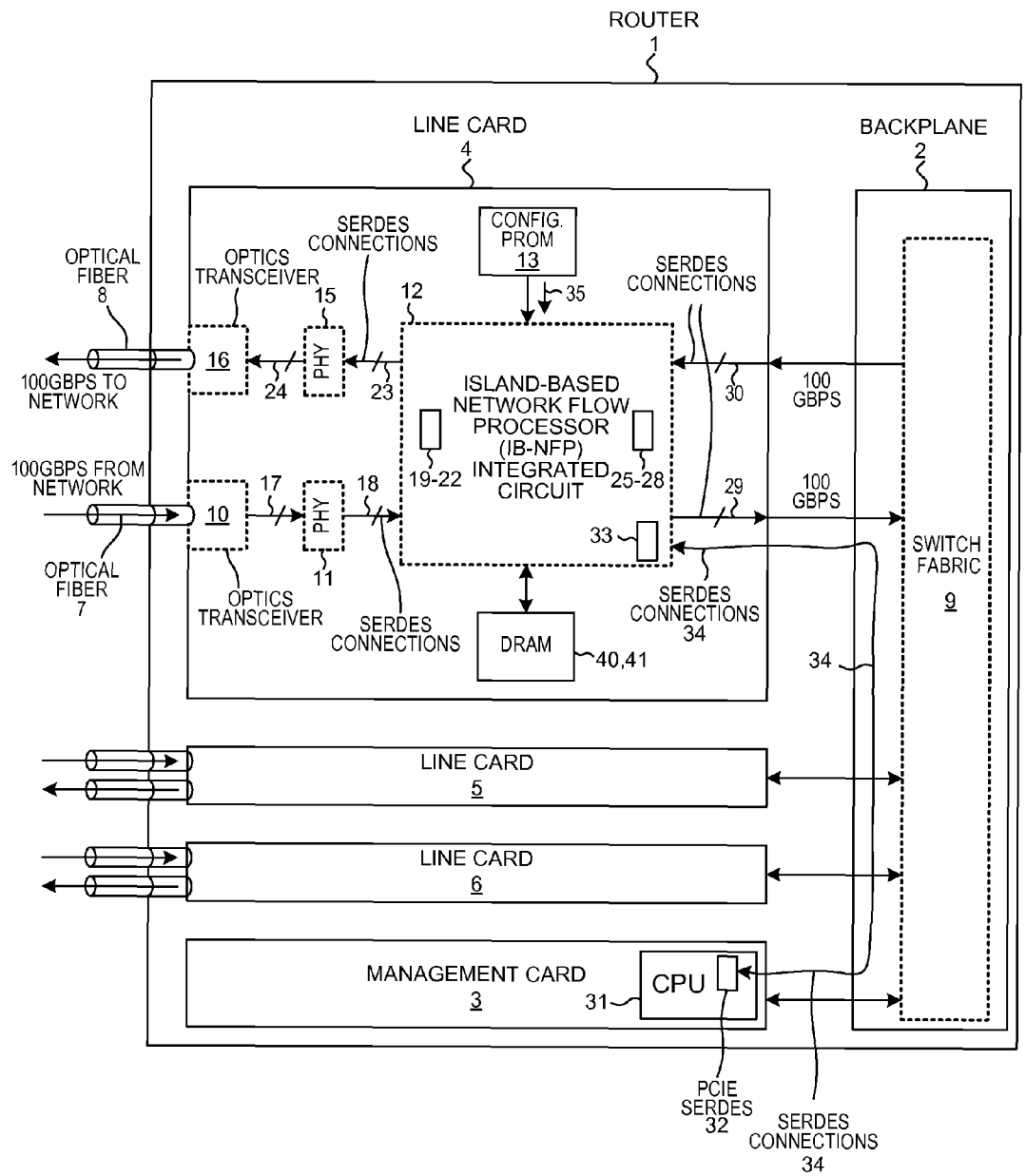
FIG. 1 is a simplified diagram of an MPLS (MultiProtocol Label Switching) router 1.

FIG. 1 is a simplified diagram of an MPLS (MultiProtocol Label Switching) router 1. Router 1 includes a backplane 2, a management card 3, and line cards 4-6. Each of the line cards can receive 100 Gbps (gigabits per second) packet traffic from another network via a fiber optic cable 7 and also can transmit 100 Gbps packet traffic to another network via another fiber optic cable 8. In addition, each line card can receive 100 Gbps packet traffic from the switch fabric 9 of the backplane and can also transmit 100 Gbps packet traffic to the switch fabric. Line cards 4-6 are of identical construction. In this example, flows of packets are received into line card 4 from a network via the fiber optic cable 7 or from the switch fabric 9. Certain functions then need to be performed on the line card including looking up MPLS labels, determining destinations for incoming flows of packets, and scheduling the transmitting of flows of packets. Packets of the flows pass from the line card 4 and out either to the network via optical cable 8 or to the switch fabric 9.

Line card 4 includes a first optical transceiver 10, a first PHY integrated circuit 11, an Island-Based Network Flow Processor (IB-NFP) integrated circuit 12, a configuration Programmable Read Only Memory (PROM) 13, an external memory such as Dynamic Random Access Memory (DRAM) 40-41, a second PHY integrated circuit 15, and a second optical transceiver 16. Packet data received from the network via optical cable 7 is converted into electrical signals by optical transceiver 10. PHY integrated circuit 11 receives the packet data in electrical form from optical transceiver 10 via connections 17 and forwards the packet data to the IB-NFP integrated circuit 12 via SerDes connections 18. In one example, the flows of packets into the IB-NFP integrated circuit from optical cable 7 is 100 Gbps traffic. A set of four SerDes circuits 19-22 within the IB-NFP integrated circuit 12 receives the packet data in serialized form from SerDes connections 18, deserializes the packet data, and outputs packet data in deserialized form to digital circuitry within IB-NFP integrated circuit 12.

Similarly, IB-NFP integrated circuit 12 may output 100 Gbps packet traffic to optical cable 8. The set of four SerDes circuits 19-22 within the IB-NFP integrated circuit 12 receives the packet data in deserialized form from digital circuitry within integrated circuit 12. The four SerDes circuits 19-22 output the packet data in serialized form onto SerDes connections 23. PHY 15 receives the serialized form packet data from SerDes connections 23 and supplies the packet data via connections 24 to optical transceiver 16. Optical transceiver 16 converts the packet data into optical form and drives the optical signals through optical cable 8. Accordingly, the same set of four duplex SerDes circuits 19-22 within the IB-NFP integrated circuit 12 communicates packet data both into and out of the IB-NFP integrated circuit 12.

IB-NFP integrated circuit 12 can also output packet data to switch fabric 9. Another set of four duplex SerDes circuits 25-28 within IB-NFP integrated circuit 12 receives the packet data in deserialized form, and serializes the packet data, and supplies the packet data in serialized form to switch fabric 9 via SerDes connections 29. Packet data from switch fabric 9 in serialized form can pass from the switch fabric via SerDes connections 30 into the IB-NFP integrated circuit 12 and to the set of four SerDes circuits 25-28. SerDes circuits 25-28 convert the packet data from serialized form into deserialized form for subsequent processing by digital circuitry within the IB-NFP integrated circuit 12.

Management card 3 includes a CPU (Central Processing Unit) 31. CPU 31 handles router management functions including the configuring of the IB-NFP integrated circuits on the various line cards 4-6. CPU 31 communicates with the IB-NFP integrated circuits via dedicated PCIE connections. CPU 31 includes a PCIE SerDes circuit 32. IB-NFP integrated circuit 12 also includes a PCIE SerDes 33. The configuration information passes from CPU 31 to IB-NFP integrated circuit 12 via SerDes circuit 32, SerDes connections 34 on the backplane, and the PCIE SerDes circuit 33 within the IB-NFP integrated circuit 12.

External configuration PROM (Programmable Read Only Memory) integrated circuit 13 stores other types of configuration information such as information that configures various lookup tables on the IB-NFP integrated circuit. This configuration information 35 is loaded into the IB-NFP integrated circuit 12 upon power up. As is explained in further detail below, IB-NFP integrated circuit 12 can store various types of information including buffered packet data in external DRAM integrated circuits 40-41.

Figure 2:
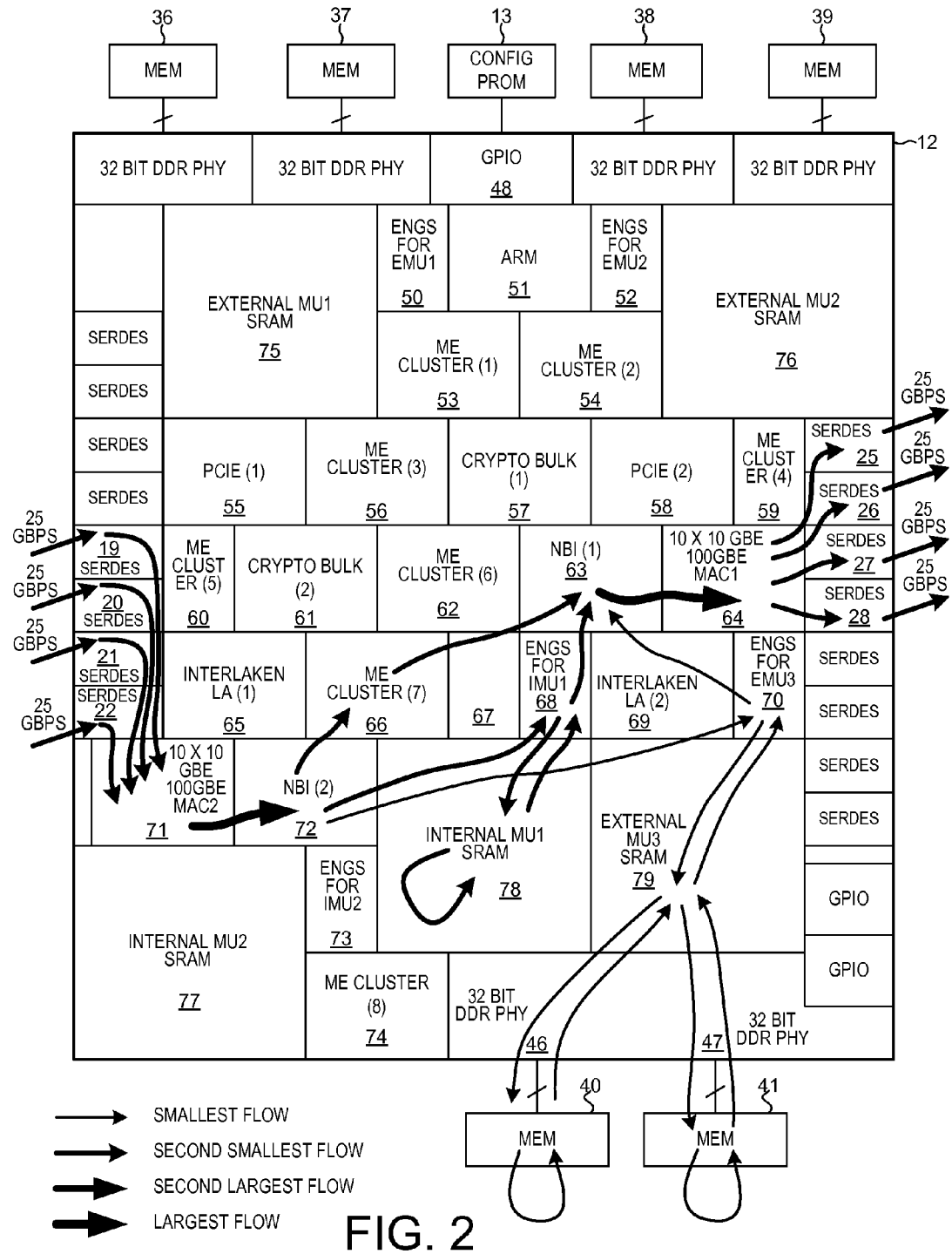
FIG. 2 is a schematic diagram that illustrates an operational example of IB-NFP integrated circuit 12 within the MPLS router 1 of FIG. 1.

FIG. 2 is a schematic diagram that illustrates an operational example of IB-NFP integrated circuit 12 within the MPLS router 1 of FIG. 1. 100 Gbps packet traffic is received via optical cable 7 (see FIG. 1), flows through optics transceiver 10, flows through PHY integrated circuit 11, and is received onto IB-NFP integrated circuit 12 spread across the four SerDes I/O blocks 19-22. Twelve virtual input ports are provided at this interface in the example of FIG. 1. The symbols pass through direct dedicated conductors from the SerDes blocks 19-22 to ingress MAC island 71. Ingress MAC island 71 converts successive symbols delivered by the physical coding layer into packets by mapping symbols to octets, by performing packet framing, and then by buffering the resulting packets for subsequent communication to other processing circuitry. The packets are communicated from MAC island 71 across a private inter-island bus to ingress NBI (Network Bus Interface) island 72. Although dedicated connections are provided for this purpose in the particular example described here, in other examples the packets are communicated from ingress MAC island 71 to ingress NBI island via the configurable mesh data bus.

For each packet, the functional circuitry of ingress NBI island 72 examines fields in the header portion to determine what storage strategy to use to place the packet into memory. In one example, the NBI island examines the header portion and from that determines whether the packet is an exception packet or whether the packet is a fast-path packet. If the packet is an exception packet then the NBI island determines a first storage strategy to be used to store the packet so that relatively involved exception processing can be performed efficiently, whereas if the packet is a fast-path packet then the NBI island determines a second storage strategy to be used to store the packet for more efficient transmission of the packet from the IB-NFP.

In the operational example of FIG. 2, NBI island 72 examines a packet header, performs packet preclassification, determines that the packet is a fast-path packet, and determines that the header portion of the packet should be placed into a CTM (Cluster Target Memory) in ME (Microengine) island 66. The header portion of the packet is therefore communicated across the configurable mesh data bus from NBI island 72 to ME island 66. The CTM is tightly coupled to the ME. The ME island 66 determines header modification and queuing strategy for the packet based on the packet flow (derived from packet header and contents) and the ME island 66 informs a second NBI island 63 of these. In this simplified example being described, the payload portions of fast-path packets are placed into internal SRAM (Static Random Access Memory) MU block 78 and the payload portions of exception packets are placed into external DRAM 40 and 41.

Half island 68 is an interface island through which all information passing into, and out of, SRAM MU block 78 passes. The functional circuitry within half island 68 serves as the interface and control circuitry for the SRAM within block 78. For simplicity purposes in the discussion below, both half island 68 and MU block 78 may be referred to together as the MU island, although it is to be understood that MU block 78 is actually not an island as the term is used here but rather is a block. In one example, MU block 78 is an amount of so-called "IP" that is designed and supplied commercially by a commercial entity other than the commercial entity that designs and lays out the IB-NFP integrated circuit. The area occupied by block 78 is a keep out area for the designer of the IB-NFP in that the substantially all the wiring and all the transistors in block 78 are laid out by the memory compiler and are part of the SRAM. Accordingly, the mesh buses and associated crossbar switches of the configurable mesh data bus, the mesh control bus, and the mesh event bus do not pass into the area of block 78. No transistors of the mesh buses are present in block 78. There is an interface portion of the SRAM circuitry of block 78 that is connected by short direct metal connections to circuitry in half island 68. The data bus, control bus, and event bus structures pass into and over the half island 68, and through the half island couple to the interface circuitry in block 78. Accordingly, the payload portion of the incoming fast-path packet is communicated from NBI island 72, across the configurable mesh data bus to SRAM control island 68, and from control island 68, to the interface circuitry in block 78, and to the internal SRAM circuitry of block 78. The internal SRAM of block 78 stores the payloads so that they can be accessed for flow determination by the ME island.

In addition, a preclassifier in the ingress NBI island determines that the payload portions for others of the packets should be stored in external DRAM 40 and 41. For example, the payload portions for exception packets are stored in external DRAM 40 and 41. Interface island 70, IP block 79, and DDR PHY I/O blocks 46 and 47 serve as the interface and control for external DRAM integrated circuits 40 and 41. The payload portions of the exception packets are therefore communicated across the configurable mesh data bus from NBI island 72, to interface and control island 70, to external MU SRAM block 79, to 32-bit DDR PHY I/O blocks 46 and 47, and to external DRAM integrated circuits 40 and 41. At this point in the operational example, the packet header portions and their associated payload portions are stored in different places. The payload portions of fast-path packets are stored in internal SRAM in MU block 78, whereas the payload portions of exception packets are stored in external SRAM in external DRAMs 40 and 41.

ME island 66 informs second NBI island 63 where the packet headers and the packet payloads can be found and provides the second NBI island 63 with an egress packet descriptor for each packet. The egress packet descriptor indicates a queuing strategy to be used on the packet. Second NBI island 63 uses the egress packet descriptor to read the packet headers and any header modification from ME island 66 and to read the packet payloads from either internal SRAM 78 or external DRAMs 40 and 41. Second NBI island 63 places packet descriptors for packets to be output into the correct order. For each packet that is then scheduled to be transmitted, the second NBI island uses the packet descriptor to read the header portion and any header modification and the payload portion and to assemble the packet to be transmitted. Note that the header modification is not actually part of the egress packet descriptor, but rather it is stored with the packet header by the ME when the packet is presented to the NBI. The second NBI island then performs any indicated packet modification on the packet. The resulting modified packet then passes from second NBI island 63 and to egress MAC island 64.

Egress MAC island 64 buffers the packets, and converts them into symbols. The symbols are then delivered by conductors from the MAC island 64 to the four SerDes I/O blocks 25-28. From SerDes I/O blocks 25-28, the 100 Gbps outgoing packet flow passes out of the IB-NFP integrated circuit 12 and across SerDes connections 34 (see FIG. 1) and to switch fabric 9. Twelve virtual output ports are provided in the example of FIG. 1.

Figure 3:
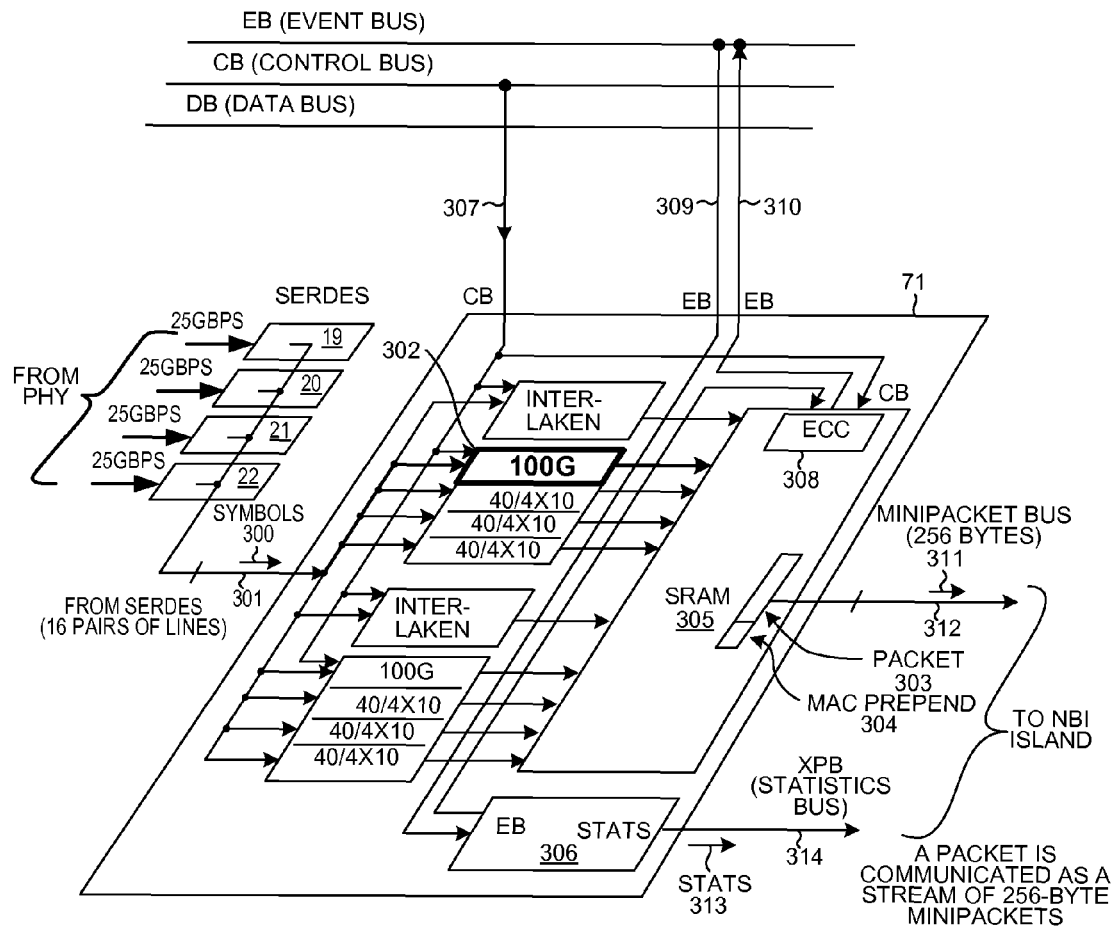
FIG. 3 is a diagram of the four SerDes I/O blocks 19-22 and the ingress MAC island 71 of IB-NFP integrated circuit 12.

FIG. 3 is a diagram of the four SerDes I/O blocks 19-22 and the ingress MAC island 71. The symbols 300 pass from the four SerDes I/O blocks and to the ingress MAC island across dedicated conductors 301. The symbols are converted into packets by a 100 Gbps ethernet block 302. The 100 Gbps ethernet block 302 analyzes the packets and places the results in this analysis at the beginning of the packet in the form of a "MAC prepend" value. The resulting packets and associated MAC prepend values are then buffered in SRAM 305. Reference numeral 303 identifies a part of the block that represents one packet and reference numeral 304 identifies a part of the block that represents the MAC prepend value. The MAC prepend value 304 includes: 1) an indication of the length of the packet, 2) an indication whether the packet is an IP packet, 3) and indication of whether the checksums are correct, and 4) a time stamp indicating when the packet was received.

As packets are loaded into SRAM, a statistics block 306 counts the number of packets that meet certain criteria. Various sub-circuits of the ingress MAC island are configurable. The input conductors 307 labeled CB couples the certain portions of the MAC island to the control bus tree so that these portions receive configuration information from the root of control bus tree. SRAM block 305 includes error detection and correction circuitry (ECC) 308. Error information detected and collected by ECC block 308 and statistics block 306 is reported through the local event bus and global event chain back to the ARM island 51. Ingress MAC island 71 is part of one of the local event rings. Event packets are circulated into the MAC island via conductors 309 and are circulated out of the MAC island via conductors 310. Packets that are buffered in SRAM 305 are then output from the MAC island to the ingress NBI island 72 in the form of one or more 256 byte minipackets 311 communicated across dedicated connections 312. Statistics information 313 is also communicated to the ingress NBI island 72 via dedicated connections 314.

Figure 4:
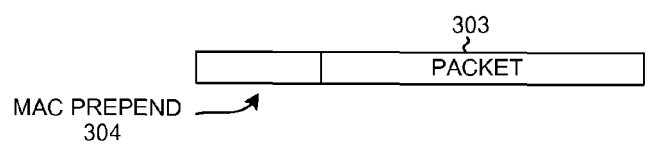
FIG. 4 is a diagram that illustrates how a packet is communicated as a sequence of minipackets across connections 312.

FIG. 4 is a diagram of packet 303 communicated across connections 312.

Figures 5, 6:
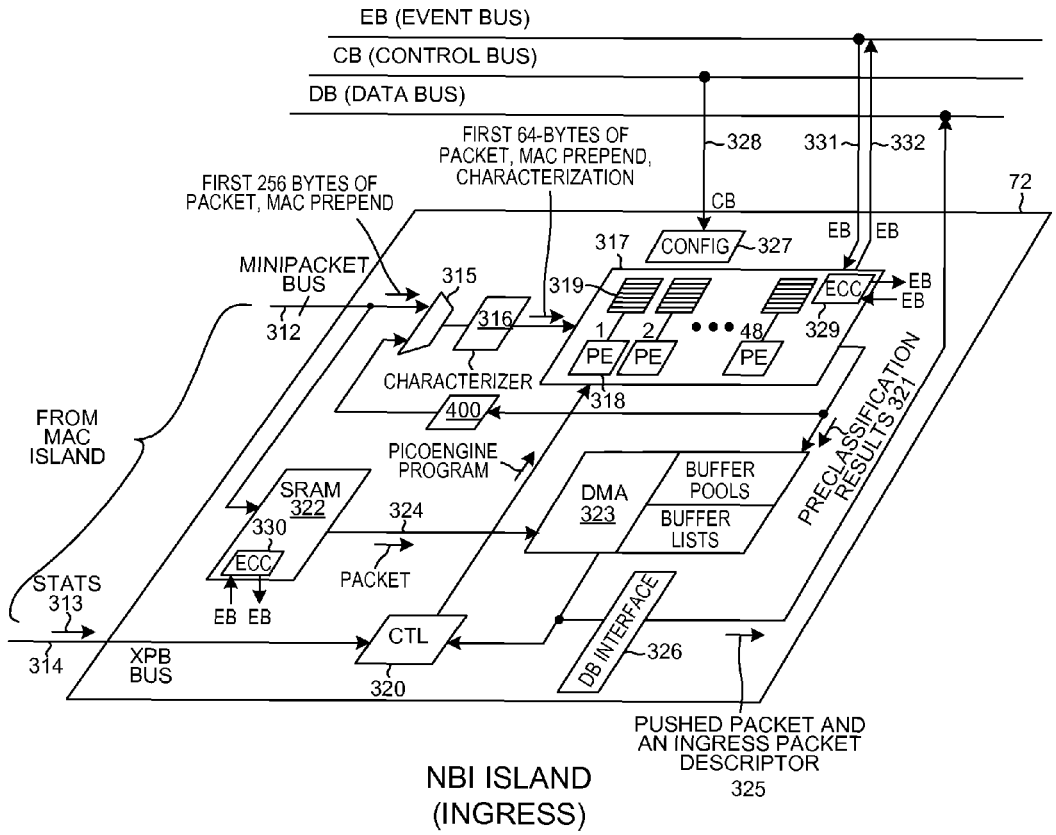
FIG. 5 is a diagram of ingress NBI island 72.
FIG. 6 is a table that sets forth the parts of preclassification results 321.

FIG. 5 is a diagram of ingress NBI island 72. Ingress NBI island 72 receives the MAC prepend and the minipackets via dedicated connections 312 from the ingress MAC island 72. The first 256 bytes of the packet and the MAC prepend pass through multiplexing circuitry 315 and to a characterizer 316. Characterizer 316 outputs characterization information, the first sixty-four bytes of the packet, and the MAC prepend. This is passed to a pool 317 of forty-eight picoengines. Each picoengine executes a program stored in an associated instruction control store. Reference numeral 318 identifies the first picoengine and reference numeral 319 identifies its instruction control store. The program in the instruction control store for each picoengine can be updated and changed under software control via control block 320. Control block 320 is also usable to receive the statistics information 313 from the MAC island via XPB bus connections 314. To perform deeper and deeper analysis into the header structure of an incoming packet, the output of the pool 317 can be passed back through a tunnel recirculation path and tunnel recirculation FIFO 400 to the characterizer 316 in an iterative fashion. Pool 317 outputs preclassification results 321.

FIG. 6 is a table that sets forth the part of preclassification results 321. The preclassification results 321 include: 1) a determination of which one of multiple buffer pools to use to store the packet, 2) a sequence number for the packet in a particular flow of packets through the IB-NFP, and 3) user metadata. The user metadata is typically a code generated by the picoengines, where the code communicates certain information about the packet. In the present operational example, the user metadata includes a bit. If the bit is set then the packet was determined to be of a first type (an exception packet), whereas if the bit is not set then the packet was determined to be of a second type (a fast-path packet).

The packet is buffered in SRAM 322. A buffer pool is a set of targets in ME islands where header portions can be placed. A buffer list is a list of memory addresses where payload portions can be placed. DMA engine 323 can read the packet out of SRAM via conductors 324, then use the buffer pools to determine a destination to which the packet header is to be DMA transferred, and use the buffer lists to determine a destination to which the packet payload is to be DMA transferred. The DMA transfers occur across the configurable mesh data bus. In the case of the exception packet of this example the preclassification user metadata and buffer pool number indicate to the DMA engine that the packet is an exception packet and this causes a first buffer pool and a first different buffer list to be used, whereas in the case of the fast-path packet the preclassification user metadata and buffer pool number indicate to the DMA engine that the packet is a fast-path packet and this causes a second buffer pool and a second buffer list to be used. Block 326 is data bus interface circuitry through which the configurable mesh data bus in accessed. Arrow 325 represents packets that are DMA transferred out of the NBI island 72 by DMA engine 323. Each packet is output with a corresponding ingress packet descriptor.

FIG. 7 is a table that sets forth the parts of an ingress packet descriptor. An ingress packet descriptor includes: 1) an address indicating where and in which ME island the header portion is stored, 2) an address indicating where and in which MU island the payload portion is, 3) how long the packet is, 4) a sequence number for the flow to which the packet belongs, 5) user metadata.

The programs stored in the instruction stores that are executable by the picoengines can be changed multiple times a second as the router operates. Configuration block 327 receives configuration information from the control bus CB tree via connections 328 and supplies the configuration information to various ones of the sub-circuits of NBI island 72 that are configurable. Error detection and correction (ECC) circuitry 329 collects error information such as errors detected in the contents of the instruction stores. ECC circuitry 329 and ECC circuitry 330 are coupled via connections 331 and 332 and other internal island connections not shown to be part of the local event ring of which the ingress MAC island 72 is a part.

Figure 9:
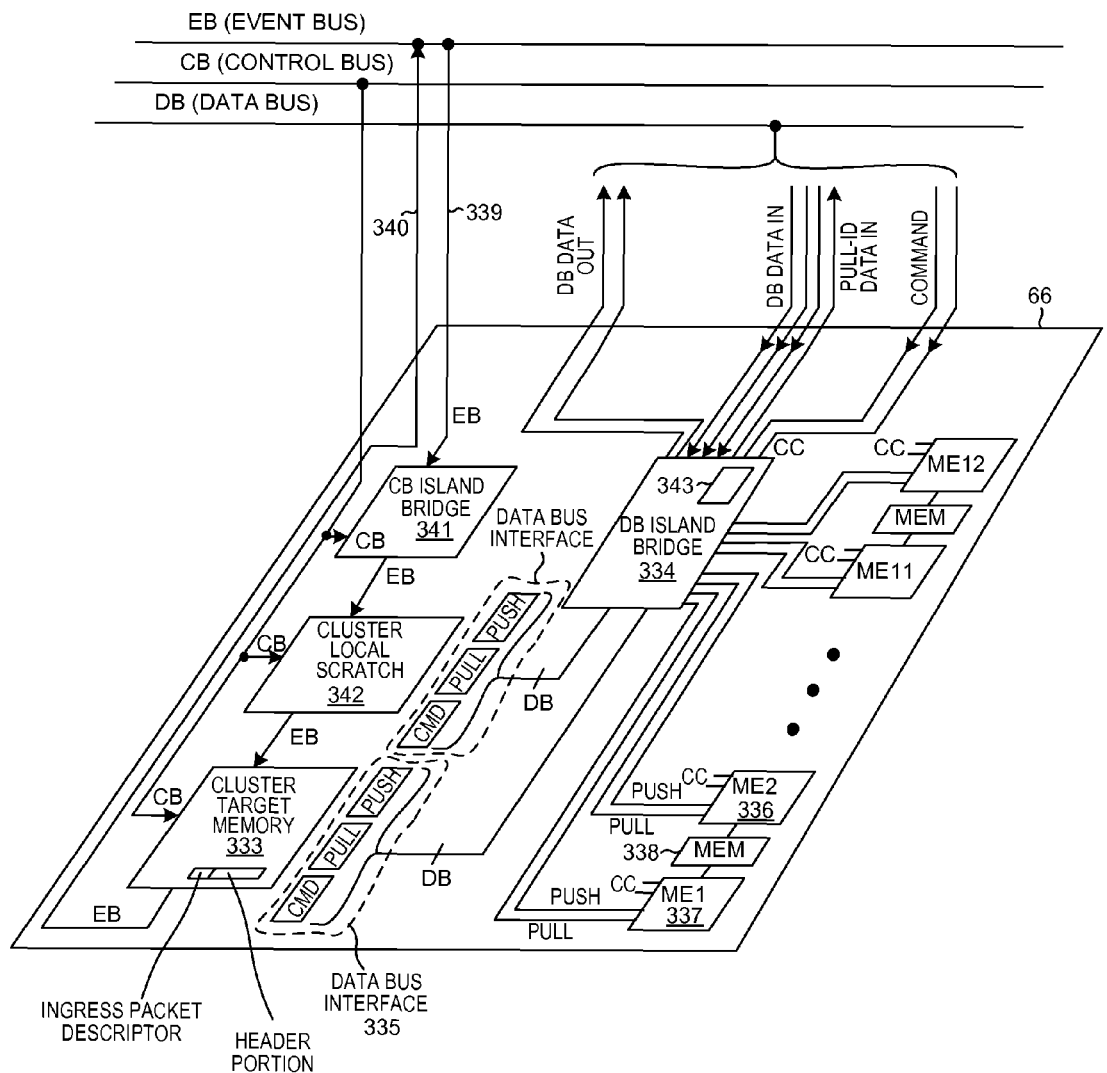
FIG. 9 is a diagram of the microengine (ME) island 66.

FIG. 9 is a diagram of the microengine (ME) island 66. In the present operational example, packet headers and the associated preclassification results are DMA transferred from the ingress NBI island 72 across the configurable mesh data bus and into the Cluster Target Memory (CTM) 333 of the ME island 66. The DMA engine 323 in the ingress NBI island is the master and the CTM 333 is the target for this transfer. The packet header portions and the associated ingress packet descriptors pass into the ME island via data bus island bridge 334 and data bus interface circuitry 335. Once in the CTM 333, the header portions are analyzed by one or more microengines. The microengines have, through the DB island bridge 334, a command out interface, a pull-id in interface, a pull-data out interface, and a push data in interface. There are six pairs of microengines, with each pair sharing a memory containing program code for the microengines. Reference numerals 336 and 337 identify the first pair of picoengines and reference numeral 338 identifies the shared memory. As a result of analysis and processing, the microengines modify each ingress packet descriptor to be an egress packet descriptor as shown in FIG. 8. Each egress packet descriptor includes: 1) an address indicating where and in which ME island the header portion is found, 2) an address indicating where and in which MU island the payload portion is found, 3) how long the packet is, 4) sequence number of the packet in the flow, 5) an indication of which queue the packet belongs to (result of the packet policy), 6) an indication of where the packet is to be sent (a result of the packet policy), 7) user metadata indicating what kind of packet it is, 8) packet sequencer identification to be used by the reorder block in determining in-order packet transmissions, 9) a drop precedence value that indicates a variable drop probability for a instantaneous queue depth range, and 10) a priority indicator that indicates if the packet associated with the packet descriptor is a high priority packet or a low priority packet. One example of a high priority packet is a control plane packet. Another example of a high priority packet is a maintenance packet. On the contrary, one example of a low priority packet is an HTTP packet.

Memory errors and other events detected in the ME island are reported via a local event ring and the global event chain back to the ARM island 51. A local event ring is made to snake through the ME island for this purpose. Event packets from the local event chain are received via connections 339 and event packets are supplied out to the local event chain via connections 340. The CB island bridge 341, the cluster local scratch 342, and CTM 333 can be configured and are therefore coupled to the control bus CB via connections 343 so that they can receive configuration information from the control bus CB.

A microengine within the ME island can use data bus commands to interact with a target, regardless of whether the target is located locally on the same ME island as the microengine or whether the target is located remotely in another island, using the same configurable data bus communications. If the target is local within the ME island, then the microengine uses data bus commands and operations as described above as if the memory were outside the island in another island, except that bus transaction values do not have a final destination value. The bus transaction values do not leave the ME island and therefore do not need the final destination information. If, on the other hand, the target is not local within the ME island then intelligence 343 within the DB island bridge adds the final destination value before the bus transaction value is sent out onto the configurable mesh data bus. From the perspective of the microengine master, the interaction with the target has the same protocol and command and data format regardless of whether the target is local or remote.

Figure 10:
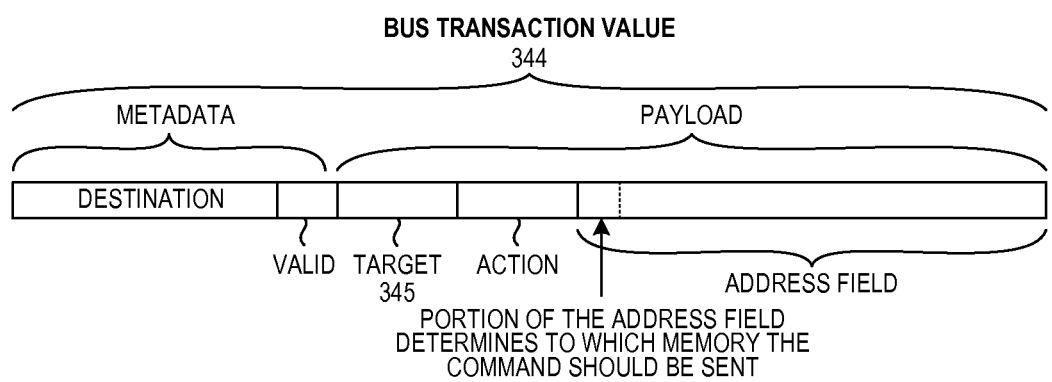
FIG. 10 is a bit sequence map of a bus transaction value used to communicate packet data from the ingress NBI island 72 to the ME island 66 across the CPP data bus.

FIG. 10 is a diagram of a bus transaction value 344 used to communicate packet data from the ingress NBI island 72 to the ME island 66. In a multi-target island such as the ME island 66, the target field 345 of the bus transaction value contains a number that indicates which target it is that is to receive the payload of the bus transaction value. In the present example, the header portions of the incoming 100 Gbps flow are written into CTM 333.

Figure 11:
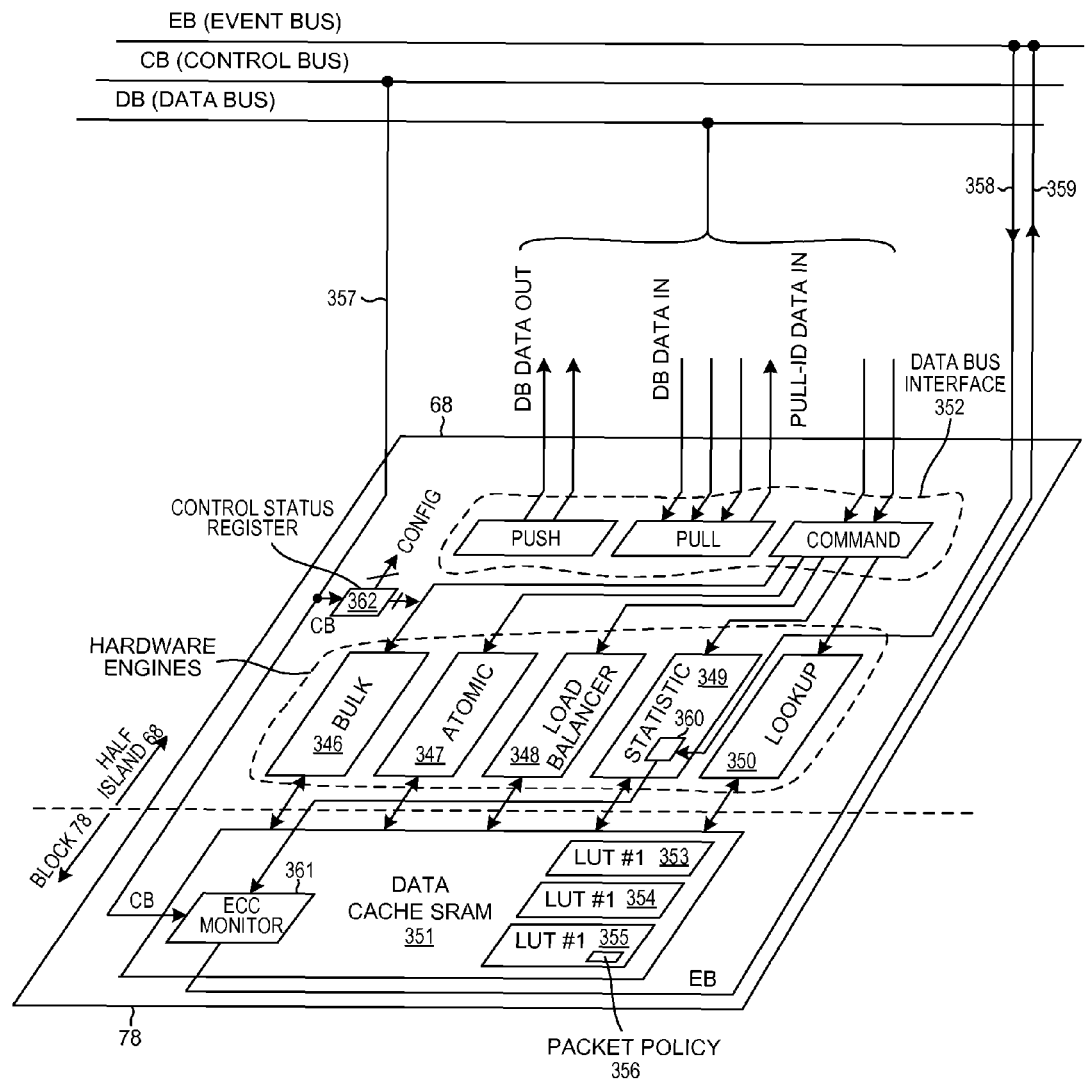
FIG. 11 is a diagram of MU half island 68 and associated SRAM block 78.

FIG. 11 is a diagram of MU half island 68 and SRAM block 78. MU half island 68 includes several hardware engines 350. In the operational example, packet payloads are DMA transferred directly from ingress NBI island 72 and across the configurable mesh data bus, through data bus interface 352 of half island 68, and into the data cache SRAM 351 block 78. The ingress NBI DMA engine 323 issues a bulk write command across the configurable mesh data bus to the bulk transfer engine 346. The destination is the MU island. The action is bulk write. The address where the data is to be written into the MU island is the address taken out of the appropriate buffer list. The bulk write command received at the MU is a bulk write, so the data bus interface 352 presents the command to the bulk engine. The bulk engine examines the command which is a write. In order to perform a write the bulk engine needs data, so the bulk engine issues a pull-id through the pull portion of interface 352, which in turn issues a pull-id back onto the configurable mesh data bus. The NBI DMA engine 323 receives the pull-id. Part of the pull-id is a data reference which indicates to the DMA engine which part of the packet is being requested as data. The DMA engine uses the data reference to read the requested part of the packet, and presents that across the data part of the data bus back to the bulk engine 346. The bulk engine 346 then has the write command and the packet data. The bulk engine 346 ties the two together, and it then writes the packet data into the SRAM 351 at the address given in the write command. In this way, packet payload portions pass from DMA engine in the ingress NBI island, across the configurable mesh data bus, through the data bus interface 352, through a bulk transfer engine 346, and into data cache SRAM 351.

In the present operational example, a microengine in the ME island 66 issues a lookup command across the configurable mesh data bus to have lookup hardware engine 350 examine tables in SRAM 351 for the presence of given data. The data to be looked for in this case is a particular MPLS label. The lookup command as received onto the MU island is a lookup command so the data base interface 352 presents the lookup command to the lookup engine. The lookup command includes a table descriptor of what part to memory to look in. The lookup command also contains a pull-id reference indicating what to look for (the MPLS label in this case). The data to look for is actually stored in transfer registers of the originating microengine. The lookup engine 350 therefore issues a pull-id out onto the configurable mesh data bus request back to the originating microengine. The microengine returns the requested data (the MPLS label to look for) corresponding to the reference id. The lookup engine now has the lookup command, the table descriptor, and the MPLS label that it is to look for. In the illustration there are three tables 353-355. A table description identifies one such table by indicating the starting address of the table in SRAM 351, and how large the table is. If the lookup operation is successful in that the lookup hardware engine 350 finds the MPLS label in the table identified by the table descriptor, then the lookup hardware engine 350 returns a predetermined value "Packet Policy" 356 back to the requesting microengine. A packet policy is a code that indicates: 1) a header modification to be done, and 2) a queuing strategy to use. Lookup engine 350 returns the packet policy 356 to the originating microengine by pushing the data (the packet policy) via the push interface of the configurable mesh data bus.

Various parts of the MU island are configurable by changing the contents of registers and memory via the control bus CB and connections 357 and control status registers 362. Errors detected on the MU island by circuits 360 and 361 are reported into a local event ring. Event packets from the local event ring are received via input connections 358 and the MU island outputs event packets to the local even ring via output connections 359. Various sub-circuits of the MU island are configurable.

Figure 12:
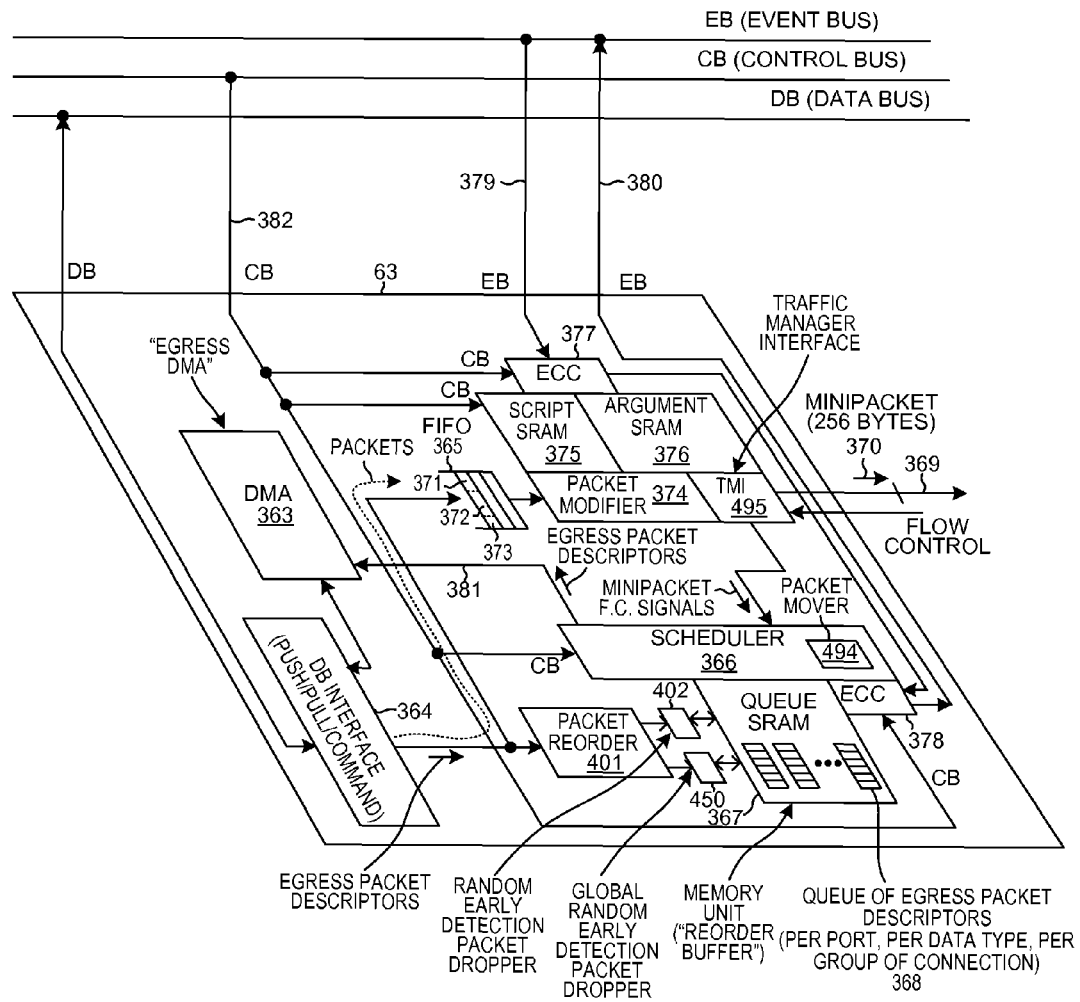
FIG. 12 is a diagram of egress NBI island 63.

FIG. 12 is a diagram of egress NBI island 63. In the operational example, ME island 66 instructs the egress NBI island 63 to transmit a packet by supplying the egress NBI island with an egress packet descriptor of the packet to be transmitted. The ME island supplies the egress packet descriptor to the egress NBI island by issuing a transmit packet command across the configurable mesh data bus and to the packet reorder block 401. The packet reorder block 401 responds by pulling the packet descriptor from the ME island across the configurable mesh data bus. In this way, multiple egress packet descriptors enter packet reorder block 401. These egress packet descriptors are reordered so that the descriptors for the packets of a flow are in proper sequence. The scheduler 366 receives the properly ordered egress packet descriptors and pushes them onto appropriate queues in queue SRAM 367. Each such queue of egress packet descriptors is per port, per data type, per group of connections. Reference numeral 368 identifies one such queue. Packets of a connection in this case share the same set of source and destination IP addresses and TCP ports. Scheduler 366 schedules packets to be transmitted by popping egress packet descriptors off the queues in appropriate orders and at appropriate times, and by supplying the popped egress packet descriptors via conductors 381 to the DMA engine 363.

The egress packet descriptor is received by Random Early Detection (RED) packet dropper with drop precedence 402 from packet reorder block 401. RED packet dropper with drop precedence 402 determines if the egress packet descriptor is to be dropped or is to be stored in the queue of egress packet descriptors. Storing the egress packet descriptor in the queue causes the packet associated with the egress packet descriptor to be transmitted. Alternatively, not storing the egress packet descriptor in the queue causes the packet associated with the egress packet descriptor to not be transmitted. Random early detection packet drop with drop precedence determines the probability of dropping a packet not only based upon that instantaneous queue depth, but also a drop precedence value that is included in the egress packet descriptor. The drop precedence is a control to vary the drop probability applied to a packet. The drop precedence value allows variable drop probabilities to be assigned to a single queue depth across various queues. The assigning of the variable drop probabilities to a single queue depth across various queues is advantageous because different queues operate to communicate different types of packets which may have different levels of priority (or importance). For example, the first queue may operate to communicate control flow information (high-priority information) for which you want to rarely drop the packet, while a second queue may operate to communicate HTTP traffic (low priority information) for which you want to more frequently drop packets.

The egress packet descriptor is also received by global Random Early Detection (RED) packet dropper 450 from packet reorder block 401. Global RED packet dropper 450 determines if the egress packet descriptor is to be dropped or is to be stored in the queue of egress packet descriptors.

Storing the egress packet descriptor in the queue causes the packet associated with the egress packet descriptor to be transmitted. Alternatively, not storing the egress packet descriptor in the queue causes the packet associated with the egress packet descriptor not to be transmitted. Global RED packet dropper determines the amount of free memory that is available in all descriptor queues. Based on the amount of free memory that is available in all descriptor queues, the Global RED packet dropper determines the probability of dropping a packet, based on the amount of free memory that is available in all descriptor queues and the priority of the packet associated with the egress packet descriptor. The global RED packet dropper can be configured to vary the probability of dropping a packet for different ranges of free queue memory. Assigning a drop probability based on the amount of free memory that is available in all descriptor queues is advantageous because it provides a mechanism to ensure that free queue memory will be available for future high-priority packets. For example, if the free queue memory falls below 10% of the total queue memory and a group of high-priority packets then need to be transmitted, there would be a high probability that some of the high-priority packets would be dropped due to a lack of free queue memory. However, utilization of the global RED packet dropper will help to ensure that the minimum amount of free queue memory required to communicate a group of high-priority packets will always be available. Thereby significantly reducing the probability that high priority packets will be dropped by the network flow processor.

As described above, egress packet descriptors can be written to memory unit 367 by both RED packet dropper 402 and the global RED packet dropper 450. Logic included in memory unit 367 processes the input from both packet dropper 402 and 450 and makes a final determination as to whether or not the packet is to be dropped.

DMA engine 363 receives an egress packet descriptor, and based on the information in the descriptor, transfers the payload portion and the header portion of the packet across configurable mesh data bus and DB interface 364 and into FIFO 365. In the illustration of FIG. 6, each entry in FIFO 365 includes a complete packet having the header portion 371, the payload portion 372, and a script identifier portion 373. The script identifier portion 373 was added by the ME island. As a result of the lookup performed at the direction of the ME island, a packet policy was determined, and part of this packet policy is an indication of what of the packet header to change and how to change it before the packet is transmitted. An example of such a modification is to change the MAC source and destination addresses at the time the packet is output from the IB-NFP.

In a typical MPLS router, the MPLS labels of packets can remain the same as the packets flow into and through and out of the router. The MAC addresses of such a packet, however, should be changed on a hop by hop basis. The MAC hop on the ingress may be different from the MAC address on the egress. Accordingly, the packet exiting the MPLS router should have its source and destination MAC addresses changed to be appropriate for the next MAC hop into which the packet will be transmitted. The ME island supplies a script identifier portion for each packet for this purpose. The script identifier portion includes a code that identifies one of the scripts present in script SRAM 375. The identified script, when executed by packet modifier 374, causes the MAC addresses for the associated packet to be changed to values stored in an associated argument SRAM 376. Each resulting modified packet is then output from the egress NBI island 63 as a sequence of 256 byte minipackets across dedicated connections 369 to egress MAC island 64. Reference numeral 370 identifies one such minipacket. The egress MAC island 64 has limited memory and therefore flow control needs to be applied to the communication of minipackets between packet modifier 374 and MAC island 64. Flow control of the minipacket communication is performed by the Traffic Manager Interface (TMI) circuit 495. The operation of TMI 495 is described in greater detail below.

Error conditions detected by ECC circuits 377 and 378 are injected into a local event ring in the form of event packets. Event packets from the local event ring are received onto the egress NBI island via connections 379, and event packets from the egress NBI island are supplied through the remainder of the local event ring via connections 380. Various parts of the egress NBI island are configurable. Configuration information for this purpose is received onto the egress NBI island from the control bus CB via connections 382.

Figure 13:
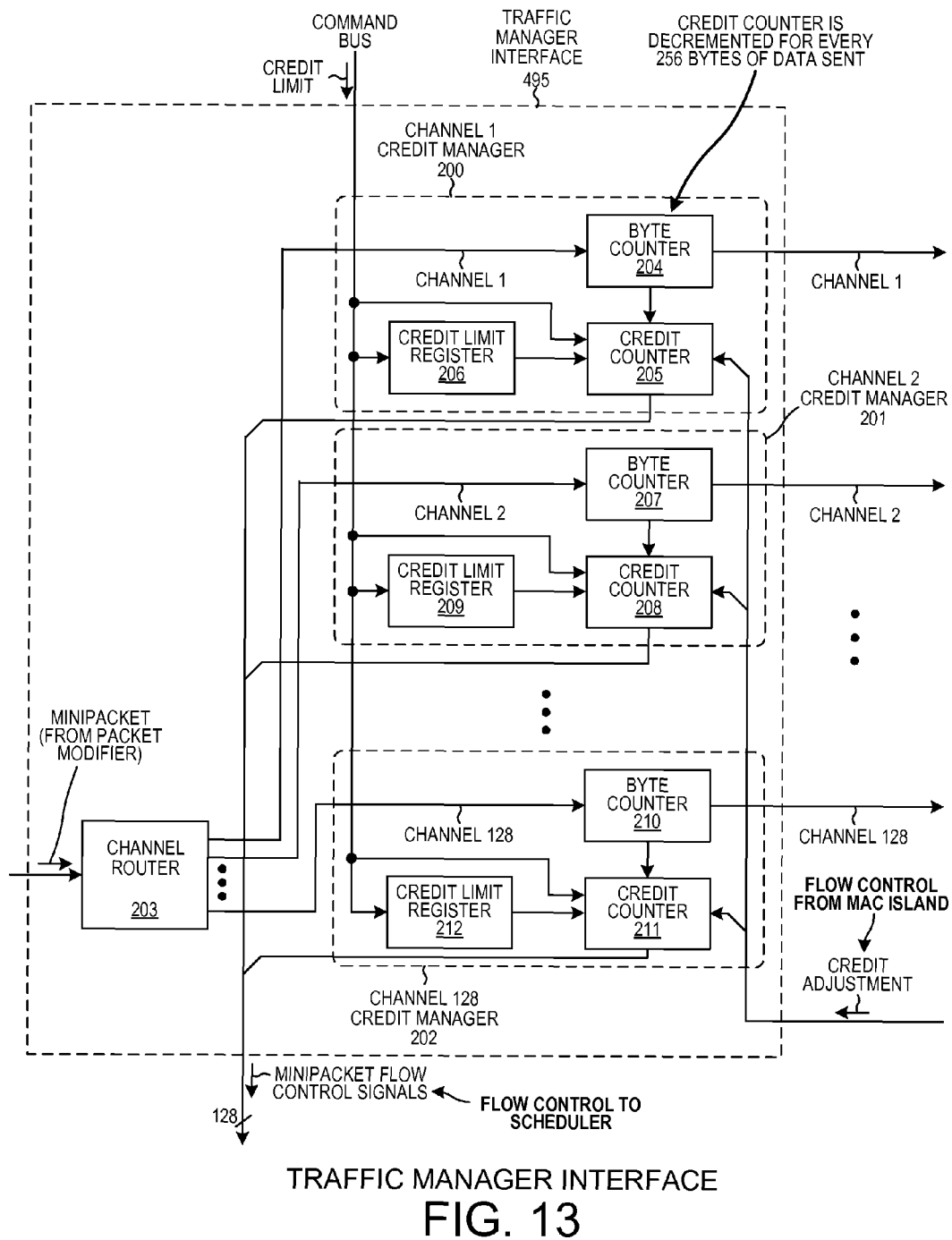
FIG. 13 is a diagram of a first example of a traffic manager 495.

FIG. 13 is a diagram of a first example of traffic manager interface circuit 495. Traffic manager interface circuit 495 includes a channel router 203, a channel "1" credit manager 200, a channel "2" credit manager 201 up to channel 128 credit manager 202. It is noted herein that a channel credit manager is not showing four channels three through 127; however, channel credit manager is for channels 3 through 127 are present in this example but not shown due to drawing sheet size limitations. Each channel credit manager includes a byte counter, a credit counter, and a credit limit register. For example channel 1 credit manager 200 includes byte counter 204, credit counter 205, and credit limit register 206. In operation the traffic manager interface circuit 495 receives minipackets from packet modifier 374.

Each minipacket includes a channel number. The channel number indicates which channel of the available 128 channels between the egress NBI island and the egress MAC island are to be utilized to transmit the minipacket. In one example the channel number is included in an out-of-band control info portion of the minipacket. Channel router 203 reads the channel number from the minipacket and routes the minipacket to one of the 128 channels accordingly. In one example, the channel router includes a parser, a decoder, and a demultiplexer. The parser parses the minipacket and extracts the channel number bits. The decoder decodes the channel number bits to determine a selected channel. The minipacket is applied to the data input of the demultiplexer. Each output of the demultiplexer is couple to one of one hundred and twenty-eight channels. The output of the decoder is coupled to the select input of the demultiplexer. Therefore, the channel to which the minipacket output is controlled by the output of the decoder.

Each channel credit manager is configured via a command bus. A processor uses the command bus to set a credit limit value and a current credit value. Upon start up a credit limit value is written into the credit limit register and a current credit value is written into the current credit value register across the command bus. The credit limit value is a minimum credit value required to transmit in a packet to the egress MAC island. The current credit value is updated for each minipacket that is communicated across the channel.

Figure 14:
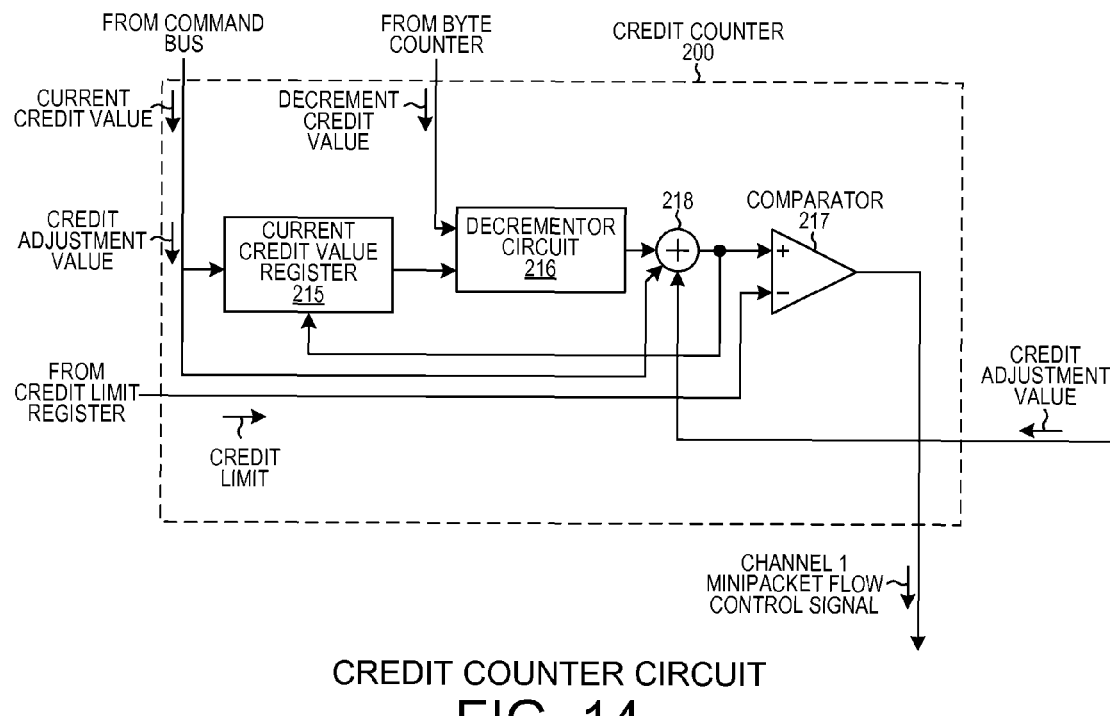
FIG. 14 is a diagram of a first example of a credit counter circuit 200.

FIG. 14 is a diagram of credit counter circuit 200. A minipacket is routed to one of the one hundred and twenty-eight channels by channel router 203. When a minipacket is received by channel 1 credit manager 200 the minipacket is routed to byte counter 204, which counts the number of bytes included in the minipacket and transmits the minipacket to the egress MAC island. Byte counter 204 asserts a decrement credit value signal when the number of bytes communicated via channel number 1 exceeds 256 bytes.

Byte counter 204 resets its byte count once the decrement credit value signal is asserted. In this fashion byte counter 204 continually counts up to 256 bytes repeatedly. Credit counter 200 receives the decrement credit value signal from the byte counter 204. In response, credit counter 200 decrements one credit from the current credit value. As noted above, the current credit value that is programmed by a processor across a command bus and stored in the current credit value register 215. Decrementor circuit 216 performs a decrement operation by reading the current credit value from the current credit value register 215, decrementing one credit from the current credit value, and outputs the decremented credit value. When the decrement credit value is not asserted, the decrementor circuit 216 does not decrement the current credit value.

The credit counter 200 may also receive a credit adjustment value from the MAC egress island. The MAC egress island can adjust the credit assigned to each channel using the credit adjustment value. In one example, the MAC egress island transmits a credit adjustment value to increase the current credit value of credit counter 200 when a packet received via channel 1 is transmitted by the egress MAC island. In this example, the decremented credit value is incremented by one credit due to the credit adjustment value received from the MAC egress island and is compared against the credit limit value by comparator 217. The credit limit value is read from the credit limit register 206. The comparator output is a logic high when the current credit value is greater than the credit limit value. The output of comparator 217 is a channel 1 flow control signal. A logic high channel 1 flow control signal indicates that an additional minipacket may be communicated via channel 1. Alternatively, when a logic low channel 1 flow control signal indicates that an additional minipacket cannot be communicated via channel 1.

The channel 1 flow control signal is communicated from traffic manager interface circuit 495 to scheduler 366 within the egress NBI island 63. The scheduler reads the state of the channel 1 flow control signal and determines if another packet assigned to channel 1 is to be transmitted. When the channel 1 flow control signal is a logic high value, the scheduler schedules another packet assigned to channel 1 to be transmitted. When the channel 1 flow control signal is a logic low value, the scheduler does not schedule another packet assigned to channel 1 to be transmitted. In this fashion, the traffic manager interface circuit determines if sufficient credits are available for a given channel and prevents additional data from being transmitted when an insufficient amount of credits are available. As discussed above, the scheduler causes packets to be transmitted by communicating an egress packet descriptor associated with the packet to DMA 363. Alternatively, the schedule causes a packet not to be sent by not communicating an egress packet descriptor associated with the packet to DMA 363.

Credits can also be added to and subtracted from the current credit value of each channel credit manager by a processor across the command bus. For example, during operation a processor may determine that the data assigned to be transmitted via channel 1 is high priority data (such as maintenance data) and therefore add credits to the current credit value of channel 1 credit manager. However, given that there are only one thousand and twenty-four credits available in the entire system, the amount of credits added to one channel credit manager must also be subtracted from another channel credit manager to maintain a total credit count of one thousand and twenty-four. Adding credits to the current credit value of a credit manager increases the amount of data that is allowed to be transmitted via the channel. The processor can add or subtract credits by writing a new current credit value to the current credit value register 215. The processor can also send a positive or negative credit adjustment value to adder 218.

Similarly, credits can also be subtracted from the current credit value of a channel credit manager by a processor across the command bus. For example, during operation a processor may determine that the data assigned to be transmitted via channel 1 low priority data (such as HTTP protocol data) and therefore subtracts credits from the current credit value of channel 1. Subtracting credits from the current credit value of a credit manager decreases the amount of data that is allowed to be transmitted via the channel. The processor can add credits by writing a new current credit value to the current credit value register 215. The processor can also send a negative credit adjustment value to adder 218.

At the system level, the total amount of credits is defined and the credits are allocated across the one hundred and twenty-eight credit counters in the traffic manager interface circuit. In one example, the total amount of credits that can be allocated across the one hundred and twenty-eight channels is one thousand and twenty-four credits and the byte counter is configured to assert the decrement credit value signal for every two hundred and fifty-six bytes of data that is transmitted through the channel, thereby requiring two tokens to transmit a two hundred and fifty-seven byte packet. In this configuration, the egress MAC island is configured to consume up to one thousand and twenty-four credits worth of data across the one hundred and twenty-eight channels.

This system provides a mechanism for providing flow control between the packet modifying circuitry located on the egress NBI island and the physical interface circuitry located on the egress MAC island. Furthermore, this credit based system can be updated on the fly during operation based upon varying operating conditions.

Figure 15:
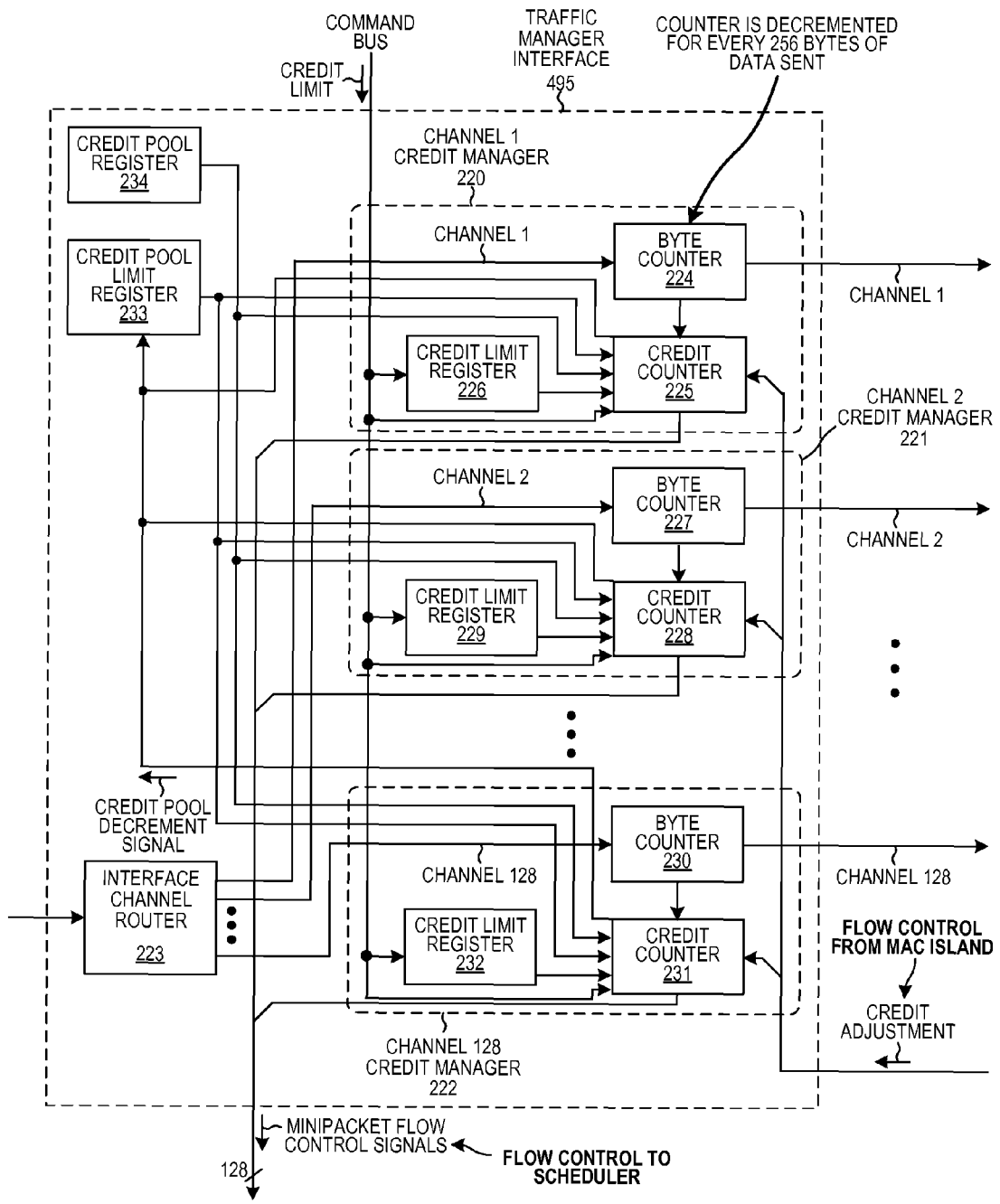
FIG. 15 is a diagram of a second example of a traffic manager 495.

FIG. 15 is a diagram illustrating a second example of a traffic manager interface circuit 495 with a credit pool. Traffic manager interface circuit 495 includes a channel router 223, a channel 1 credit manager 220, a channel 2 credit manager 221 up to channel 128 credit manager 222. It is noted herein that a channel credit manager is not showing four channels three through 127; however, channel credit manager is for channels 3 through 127 are present in this example but not shown due to drawing sheet size limitations. Each channel credit manager includes a byte counter, a credit counter, and a credit limit register. For example channel 1 credit manager 220 includes byte counter 224, credit counter 225, and credit limit register 226. The traffic manager interface 495 also includes a credit pool register 234 and a credit pool limit register 233.

In operation the traffic manager interface circuit 495 receives minipackets from packet modifier 374. Each minipacket includes a channel number. The channel number indicates which channel of the available 128 channels between the egress NBI island and the egress MAC island are to be utilized to transmit the minipacket. In one example the channel number is included in an out-of-band control info portion of the minipacket. Channel router 223 reads the channel number from the minipacket and routes the minipacket to one of the 128 channels accordingly.

Each channel credit manager is configured via a command bus. A processor uses the command bus to set a credit limit value and a current credit value. Upon start up a credit limit value is written into the credit limit register and a current credit value is written into the current credit value register across the command bus. The credit limit value is a minimum credit value required to transmit in a packet to the egress MAC island. The current credit value is updated for each minipacket that is communicated across the channel. In a similar fashion, the credit pool register 234 and the credit pool limit register 233 are configured via the command bus. The credit pool register stores a credit pool value and the credit pool limit register stores a credit pool limit value. The credit pool value represents a number of credits that can be shared among a group of channel credit mangers. The credit pool limit value represents the minimum credit pool value that must be maintained. The example illustrated in FIG. 15 shows a single credit pool being shared across one hundred and twenty-eight channel credit managers; however, the single credit pool can be configured to be shared across only a subset of the one hundred and twenty-eight channel credit managers. Likewise, additional credit pools can be added and shared across a second subset of channel credit managers.

Figure 16:
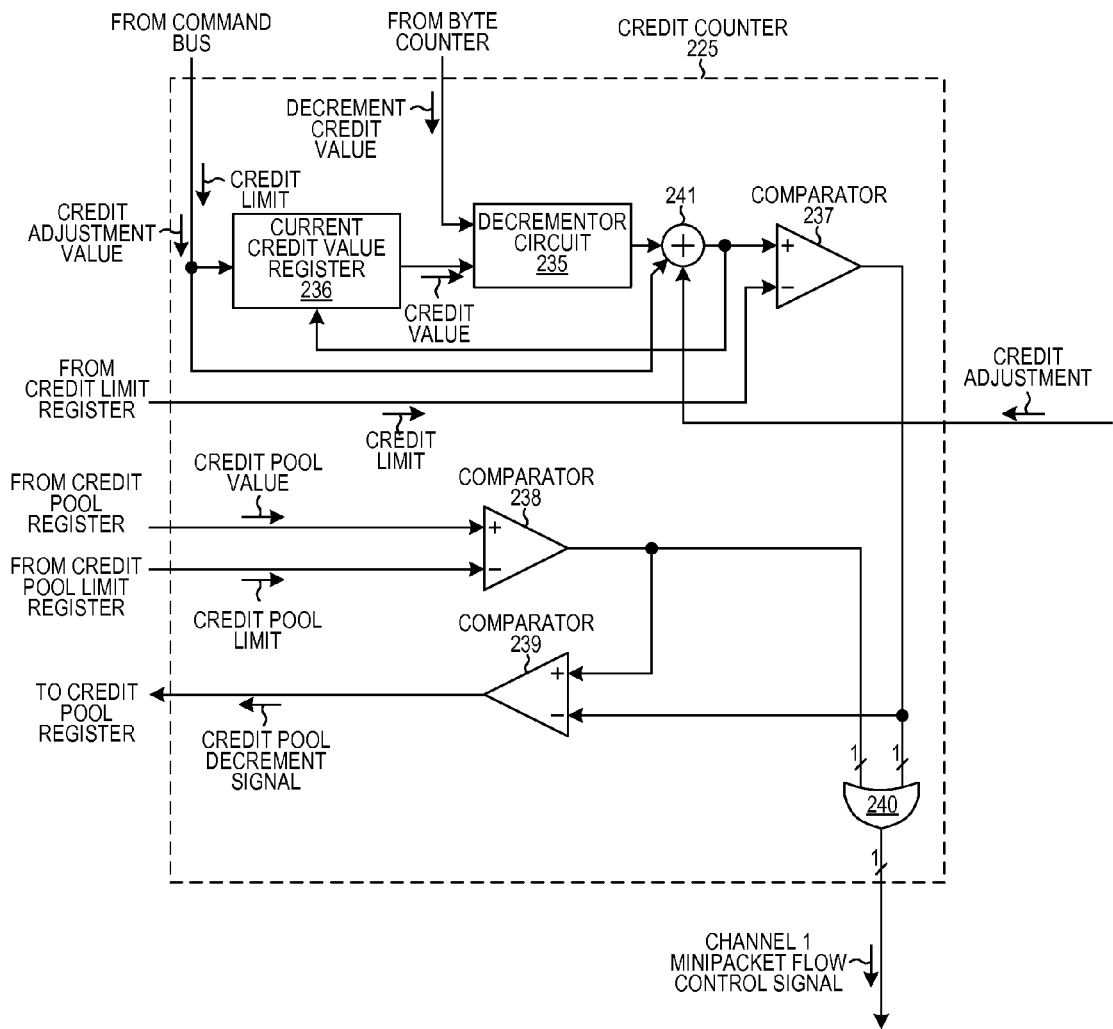
FIG. 16 is a diagram of a second example of a credit counter circuit 205.

FIG. 16 is a diagram illustrating credit counter circuit 225. A minipacket is routed to one of the one hundred and twenty-eight channels by channel router 223. In one example, the channel router includes a parser, a decoder, and a demultiplexer. The parser parses the minipacket and extracts the channel number bits. The decoder decodes the channel number bits to determine a selected channel. The minipacket is applied to the data input of the demultiplexer. Each output of the demultiplexer is couple to one of one hundred and twenty-eight channels. The output of the decoder is coupled to the select input of the demultiplexer. Therefore, the channel to which the minipacket output is controlled by the output of the decoder.

When a minipacket is received by channel 1 credit manager 220 the minipacket is routed to byte counter 224, which counts the number of bytes included in the minipacket and transmits the minipacket to the egress MAC island. Byte counter 224 asserts a decrement credit value signal when the number of bytes communicated via channel number 1 exceeds 256 bytes. Byte counter 224 resets its byte count once the decrement credit value signal is asserted. In this fashion byte counter 224 continually counts up to 256 bytes repeatedly. Credit counter 225 receives the decrement credit value signal from the byte counter 224. In response, credit counter 225 decrements one credit from the current credit value. As noted above, the current credit value that is programmed by a processor across a command bus and stored in the current credit value register 236. Decrementor circuit 235 performs a decrement operation by reading the current credit value from the current credit value register 236, decrementing one credit from the current credit value, and outputs the decremented credit value. When the decrement credit value is not asserted, the decrementor circuit 235 does not decrement the current credit value.

The credit counter 225 may also receive a credit adjustment value from the MAC egress island. The MAC egress island can adjust the credit assigned to each channel using the credit adjustment value. In one example, the MAC egress island transmits a credit adjustment value to increase the current credit value of credit counter 225 when a packet received via channel 1 is transmitted by the egress MAC island. In this example, the decremented credit value is incremented by one credit due to the credit adjustment value received from the MAC egress island and is compared against the credit limit value by comparator 237. The credit limit value is read from the credit limit register 226. The comparator output is a logic high when the current credit value is greater than the credit limit value. The comparator output is a logic low when the current credit value is not greater than the credit limit value. The comparator output indicates if the channel 1 credit manager has enough local credits to transmit another minipacket.

Channel 1 credit manager 220 also reads the credit pool limit value from the credit pool limit register 233 and the credit pool value from the credit pool register 234 and compares both values at comparator 238. The output of comparator 238 is a logic high value when the credit pool value is greater than the credit pool limit value. The output of the comparator 238 is a logic low value when the credit pool value is not greater than the credit pool limit value. The output of comparator 238 indicates if credits are available in the credit pool for sharing with the channel credit manager.

Channel 1 credit manger 220 then compares the signal output value of comparator 237 with the signal output value of comparator 238 at comparator 239. The output of comparator 239 indicates the channel credit manager needs to use a credit from the credit pool to transmit another minipacket. When the output value of comparator 237 is a logic high value, the channel credit manager does not need to use a credit from the credit pool to transmit another packet and the credit poll decrement signal output from comparator 239 is not asserted. When the output of comparator 237 is a logic low value, the channel credit manager does need to use a credit from the credit pool to transmit another minipacket; however, the channel credit manager can only use a credit from the credit pool when there are sufficient credits available in the credit pool. When a credit is available in the credit pool and the channel credit manager does not have enough local credits to transmit another minipacket, the channel credit manager uses a credit from the credit pool and asserts the credit pool decrement signal output from comparator 239. Lastly, the channel credit manager performs a logical OR at OR gate 240. The OR gate 240 asserts the channel minipacket flow control signal when either the output of comparator 237 (local credit indicator) or the output of comparator 238 (credit pool indicator) are a logic high value, thereby instructing the scheduler to schedule another minipacket to be transmitted. The OR gate 240 does not assert the channel minipacket flow control signal when both the output of comparator 237 (local credit indicator) or the output of comparator 238 (credit pool indicator) are a logic low value, thereby instructing the scheduler not to schedule another minipacket for transmission.

The channel 1 flow control signal is communicated from traffic manager interface circuit 495 to scheduler 366 within the egress NBI island 63. The scheduler reads the state of the channel 1 flow control signal and determines if another packet assigned to channel 1 is to be transmitted. When the channel 1 flow control signal is a logic high value, the scheduler schedules another packet assigned to channel 1 to be transmitted. When the channel 1 flow control signal is a logic low value, the scheduler does not schedule another packet assigned to channel 1 to be transmitted. In this fashion, the traffic manager interface circuit determines if sufficient credits are available for a given channel and prevents additional data from being transmitted when an insufficient amount of credits are available. As discussed above, the scheduler causes packets to be transmitted by communicating an egress packet descriptor associated with the packet to DMA 363. Alternatively, the schedule causes a packet not to be sent by not communicating an egress packet descriptor associated with the packet to DMA 363.

Credits can also be added to the credit pool value and the current credit value of a channel credit manager by a processor across the command bus. For example, during operation a processor may determine that the data assigned to be transmitted via channel 1 is high priority data (such as maintenance data) and therefore add credits to the current credit value of channel 1 credit manager. Adding credits to the current credit value of a credit manager increases the amount of data that is allowed to be transmitted via the channel. The processor can add credits by writing a new current credit value to the current credit value register 215. The processor can also send a positive credit adjustment value to adder 218.

Credits can also be added to and subtracted from the current credit value of each channel credit manager by a processor across the command bus. For example, during operation a processor may determine that the data assigned to be transmitted via channel 1 is high priority data (such as maintenance data) and therefore add credits to the current credit value of channel 1 credit manager. However, given that there are only one thousand and twenty-four credits available in the entire system, the amount of credits added to one channel credit manager must also be subtracted from another channel credit manager to maintain a total credit count of one thousand and twenty-four. Adding credits to the current credit value of a credit manager increases the amount of data that is allowed to be transmitted via the channel. The processor can add or subtract credits by writing a new current credit value to the current credit value register 236. The processor can also send a positive or negative credit adjustment value to adder 241.

At the system level, the total amount of credits is defined and the credits are allocated across the one hundred and twenty-eight credit counters and the credit pool in the traffic manager interface circuit. In one example, the total amount of credits that can be allocated across the one hundred and twenty-eight channels is five hundred and twelve credits, the five hundred and twelve credits are allocated to the credit pool, and the byte counter is configured to assert the decrement credit value signal for every two hundred and fifty-six bytes of data that is transmitted through the channel, thereby requiring two tokens to transmit a two hundred and fifty-seven byte packet. In this configuration, the egress MAC island is configured to consume up to one thousand and twenty-four credits worth of data across the one hundred and twenty-eight channels.

This system provides a mechanism for providing flow control between the packet modifying circuitry located on the egress NBI island and the physical interface circuitry located on the egress MAC island. Furthermore, this credit based system can be updated on the fly during operation based upon varying operating conditions.

Figure 17:
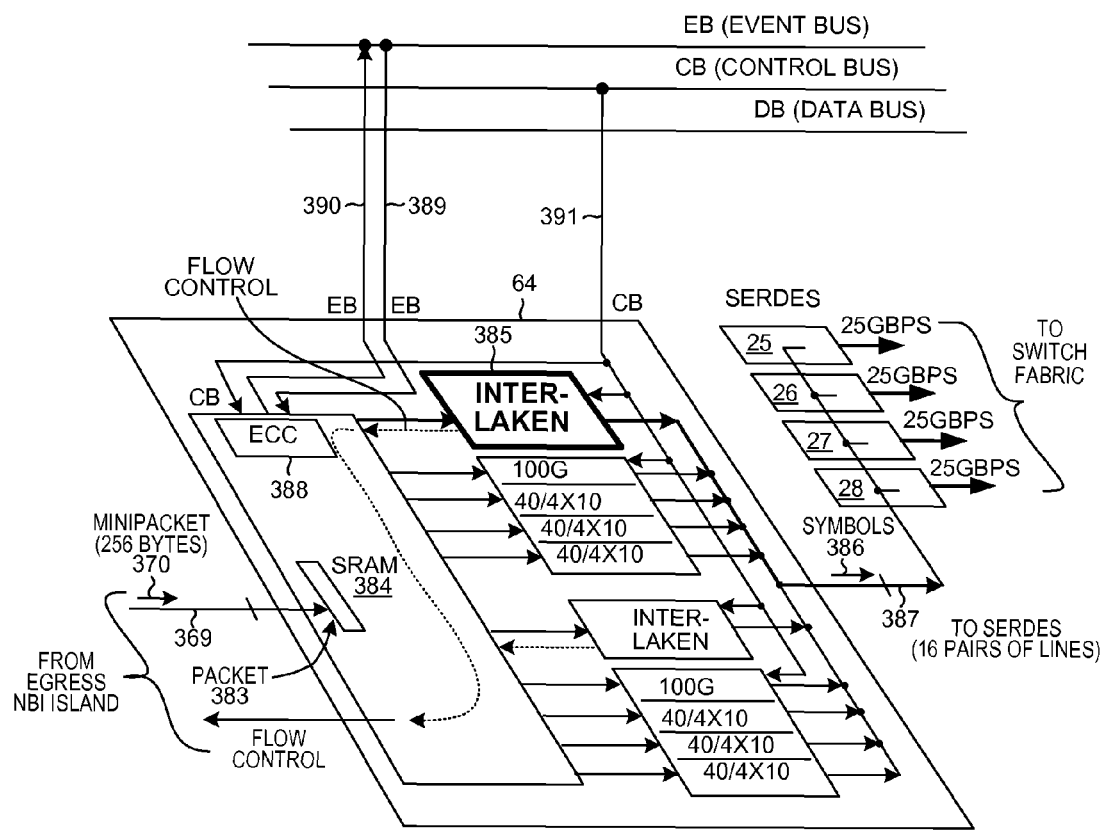
FIG. 17 is a diagram of egress MAC island 64 and SerDes blocks 25-28.

FIG. 17 is a diagram of egress MAC island 64. The MAC island provides physical network interface circuitry. A packet 383 for transmission is received from egress NBI island 63 in the form of minipackets 370 via dedicated connections 369. The packets are buffered in SRAM 384. In the operational example, the packets to be output from the egress MAC island via are converted into symbols by Interlaken block 385. The resulting symbols 386 pass via dedicated connections 387 to the four SerDes I/O blocks 25-28. As described above in connection with FIG. 1, the four SerDes I/O blocks are coupled by SerDes connections 29 to switch fabric 9 of the MPLS router 1. ECC circuitry 388 of SRAM 384 is made a part of a local event ring via EB connections 389 and 390. Sub-circuits of MAC island are configurable. Configuration information for these sub-circuits is received from the control bus tree via connections 391.

Figure 18:
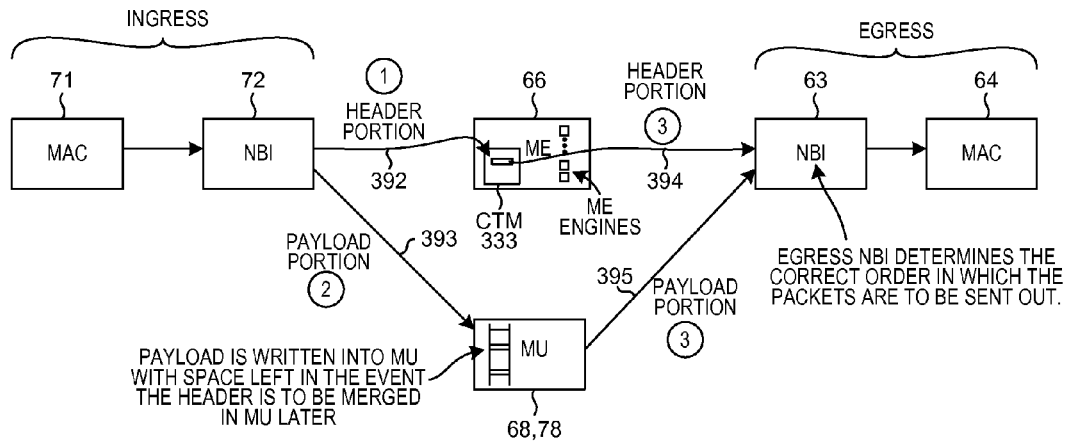
FIG. 18 is a diagram that illustrates a packet flow in the operational example when local memory resources in the CTM 333 of the ME island 66 are determined not to be scarce (for example, the processing resource is determined not to be below a predetermined threshold).

FIG. 18 is a diagram that illustrates a packet flow in the operational example when local memory resources in the CTM 333 of the ME island 66 are determined not to be scarce. An incoming packet passes through the ingress MAC island 71 and the ingress NBI island 72 as described above. Arrow 392 indicates that the header portion is then transferred (Step 1) across the configurable mesh data bus into CTM 333 of ME island 66, whereas arrow 393 indicates that the payload portion of the packet is transferred (Step 2) across the configurable mesh data bus into the MU island 68,78 without being stored in the ME island. The payload portion of each packet is stored in the MU island such that spare memory space is left at the beginning of where the payload is stored. That spare memory space is adequate to accommodate the header portion of the packet without overwriting other packet payloads. In the case of FIG. 35, however, the header portion is never written into the MU island. Microengines of the ME island and hardware engines of the MU island analyze and process the packet. Arrow 394 indicates that the header portion is then transferred (Step 3) from the ME island 66 and to the egress NBI island 63. Arrow 395 indicates that the payload portion is transferred (Step 3) from the MU island 68, 78 to the egress NBI island 63. The same step number is used because these transfers may occur simultaneously. The header portion and the payload portion are combined in the NBI island 63 and then pass through the egress MAC island 64 and the four SerDes I/O blocks and out of the IB-NFP integrated circuit.

Figure 19:
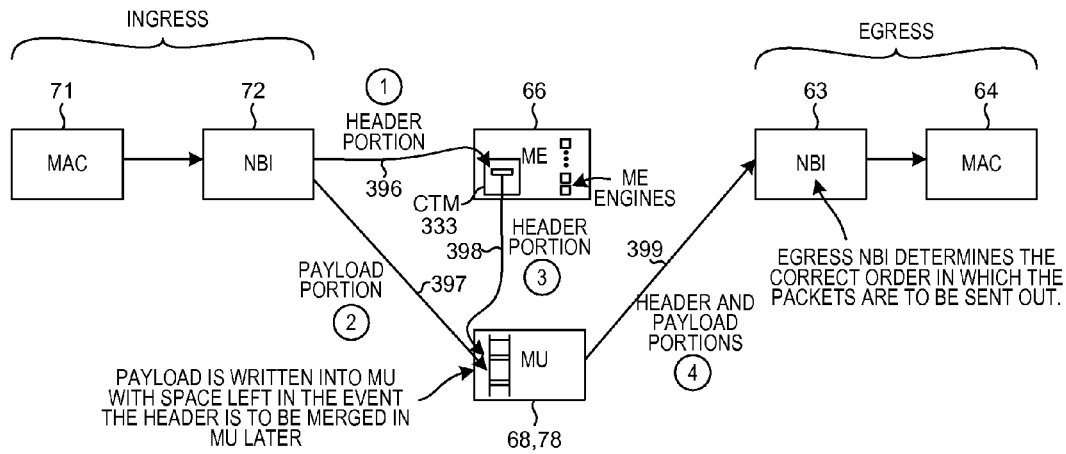
FIG. 19 is a diagram that illustrates a packet flow in the operational example when local memory resources in the CTM 333 of the ME island 66 are determined to be scarce (for example, the processing resource is determined to be below a predetermined threshold).

FIG. 19 is a diagram that illustrates a packet flow in the operational example when local memory resources in the CTM 333 of the ME island 66 are determined to be scarce. An incoming packet passes through the ingress MAC island 71 and the ingress NBI island 72 as described above. As indicated by arrow 396, the header portion is then transferred (Step 1) across the configurable mesh data bus into CTM 333 of ME island 66. Arrow 396 indicates that the payload portion of the packet is transferred (Step 2) across the configurable mesh data bus into the MU island 68, 78 without being stored in the ME island. As in the case described above in connection with FIG. 36, the payload portion of each packet is stored in the MU such that spare memory space exists at the beginning of where the payload is stored. The spare memory space is adequate to accommodate the header portion without overwriting other packet payloads. Based on how long it will take before the packet will be transmitted from the IB-NFP, the egress NBI island 63 determines that the header portion shall be moved from the ME island and to MU island in order to free up resources in the CTM 333 of the ME island. As indicated by arrow 398, the header portion is transferred (Step 3) from the ME island and is stored into the ME island into the spare memory space at the beginning of its associated payload portion. Microengines of the ME island and hardware engines of the MU island analyze and process the packet. The packet may be analyzed before the transfer 398, or after the transfer 398, or both. When the scheduler of the egress NBI island determines that the packet is to be transferred for transmission from the IB-NFP integrated circuit, then the header portion and the payload portion are DMA transferred (Step 4) together directly from the MU island and across the configurable mesh data bus and to the egress NBI island. Arrow 399 indicates this transfer of the packet header and the packet payload. The packet then passes across dedicated connections from the egress NBI island 63 to the egress MAC island 64, and through the four SerDes blocks, and out of the IB-NFP integrated circuit.

Figure 20:
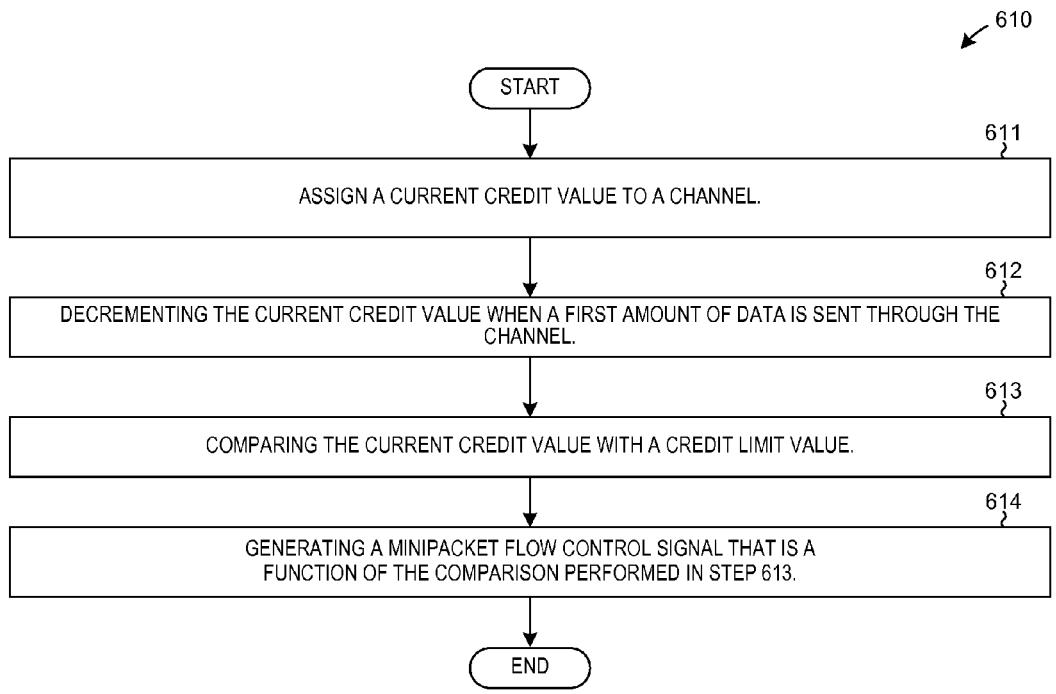
FIG. 20 is a flowchart illustrating the steps included in the method of managing minipacket traffic flow.

FIG. 20 is a flowchart diagram illustrating the steps included in a method of managing minipacket traffic flow. In step 611 a current credit value is assigned to a channel. In step 612, the current credit value is decremented when a first amount of data is sent through the channel. In step 613, the current credit value is compared with a credit limit value. In step 614, a minipacket flow control signal is generated. The mininpacket flow control signal is a function of the comparison performed in step 613.

Figure 21:
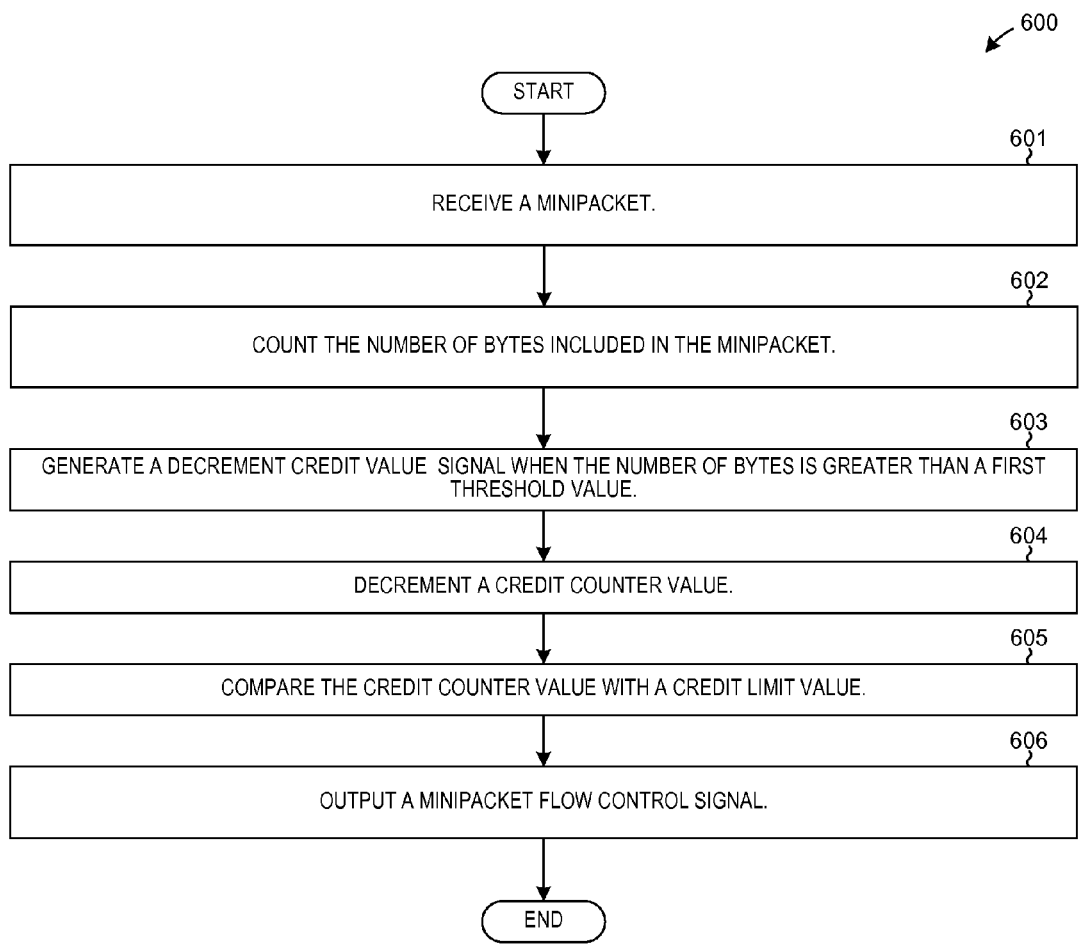
FIG. 21 is a flowchart illustrating the steps included in the method of managing minipacket traffic flow using a byte counter.
Figure 22:
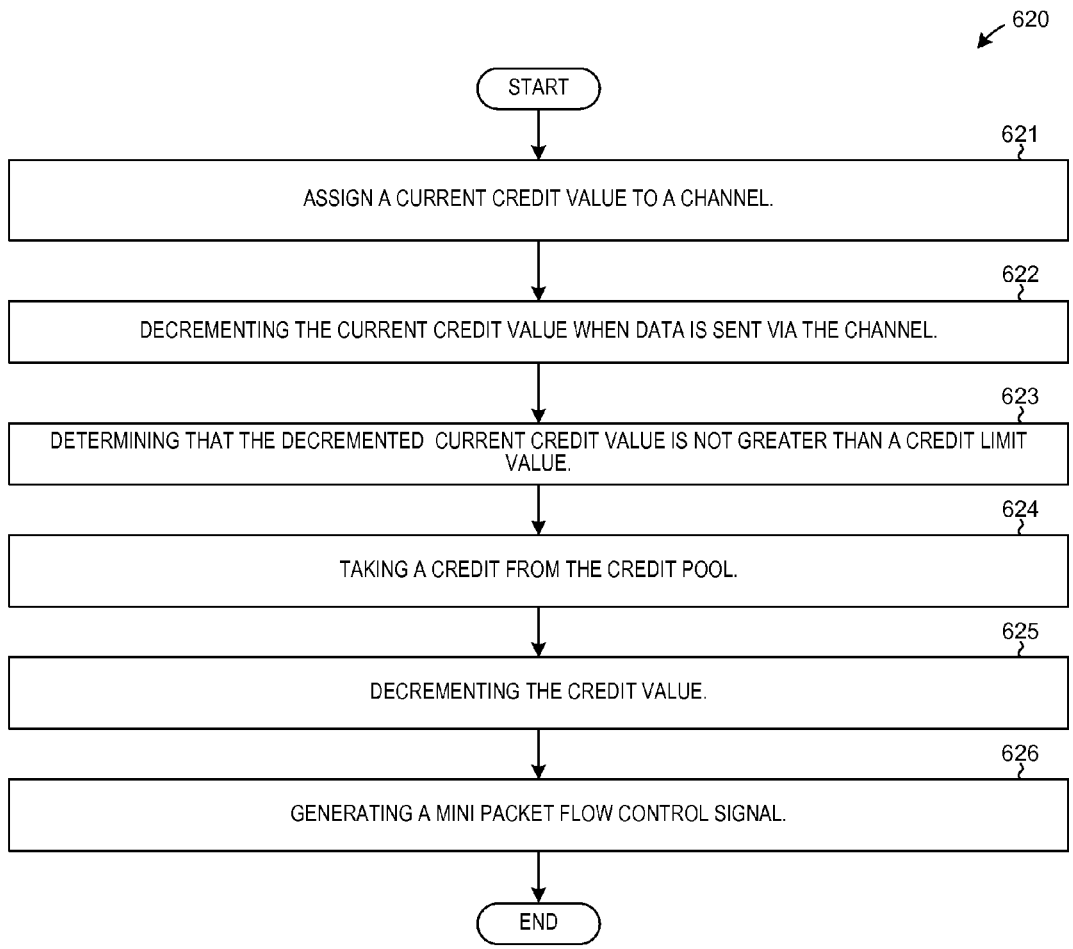
FIG. 22 is a flowchart illustrating the steps included in the method of managing minipacket traffic flow using a credit pool.

FIG. 21 is a flowchart diagram illustrating the steps included in a method of managing minipacket traffic flow using a byte counter. In step 601, a minipacket is received. In step 602 the number of bytes included in the minipacket is counted. In step 603 a decrement credit value is generated once the number of bytes counted in step 602 is greater than a first threshold value. In step 604 the current credit value is decremented. In step 605 the decremented current credit value is compared with a credit limit value. In step 606 a minipacket flow control signal is output. The minipacket flow control signal is a function of the comparison performed in step 605.

FIG. 21 is a flowchart diagram illustrating the steps included in a method of managing minipacket traffic flow using a credit pool. In step 621 a current credit value is assigned to a channel. In step 622 the current credit value is decremented when data is sent through the channel. In step 623 it is determined that the current credit value is not greater than the credit limit value. In step 624 a credit is taken from the credit pool. In step 625 decrementing the credit pool value. In step 626 generating a minipacket flow control signal.

Although certain specific embodiments are described above for instructional purposes, the teachings of this patent document have general applicability and are not limited to the specific embodiments described above. Accordingly, various modifications, adaptations, and combinations of various features of the described embodiments can be practiced without departing from the scope of the invention as set forth in the claims.

What is claimed is:

1. A circuit, comprising:
   a scheduler circuit that schedules a packet for transmission;
   a traffic manager interface circuit that receives a minipacket and communicates the minipacket to a physical network interface circuit, wherein the traffic manager interface circuit further comprises:
   a channel router that receives the minipacket and outputs the minipacket onto one of a plurality of channels; and
   a first channel credit manager that updates a current credit counter value associated with the first channel, determines if an additional minipacket is allowed to be transmitted on the first channel, and outputs a first minipacket flow control signal, wherein the minipacket is stored in a memory unit, wherein the scheduler causes the minipacket to be written to the traffic manager interface circuit, and wherein the first channel credit manager comprises:
   a credit limit register that stores a credit limit value;
   a byte counter circuit that indicates when the amount of data transmitted through the first channel exceeds a first threshold value; and
   a credit counter circuit that compares the current credit value with the credit limit value and generates the first minipacket flow control signal.

2. The circuit of claim 1, wherein the first threshold value is two-hundred and fifty-six bytes, wherein the credit limit value is written to the credit limit register across a bus, wherein the byte counter circuit asserts a first value when the amount of data transmitted on the first channel exceeds the first threshold value, wherein the byte counter circuit asserts a second value when the amount of data transmitted on the first channel does not exceed the first threshold value, and wherein the credit counter circuit decrements the current credit count value when the byte counter asserts the first value.

3. The circuit of claim 1, wherein the minipacket flow control signal indicates that an additional minipacket is not to be transmitted via the first channel when the current credit count value is less than the credit limit value, and
   wherein the minipacket flow control signal indicates that an additional minipacket is allowed to be transmitted via the first channel when the current credit count value is greater than the credit limit value.

4. The circuit of claim 1, wherein the minipacket flow control signal is received by the scheduler circuit, wherein the scheduler circuit does not schedule an additional minipacket to be transmitted via the first channel when the minipacket flow control signal is a first value, and wherein the scheduler circuit does schedule an additional minipacket to be transmitted via the first channel when the minipacket flow control signal is a second value.

5. The circuit of claim 1, wherein the first channel credit manager receives a credit adjustment value from the physical network interface circuit, wherein the first channel credit manager adds the credit adjustment value to the credit count value, and wherein the credit adjustment value can be a positive or negative value.

6. The circuit of claim 5, wherein the physical network interface circuit generates a positive credit adjustment value in response to transmitting a packet received via the first channel, and wherein the physical network interface circuit is a MAC island.

7. The circuit of claim 1, wherein the circuit further comprises:
   a second channel credit manager that updates a second current credit counter value associated with the second channel, determines if an additional minipacket is allowed to be transmitted on the second channel, and outputs a second minipacket flow control signal;
   a credit pool register that stores a credit pool value, wherein the first channel credit manger and the second channel credit manager can read from and write to the credit pool register; and
   a credit pool limit register that stores a credit pool limit value, wherein the first channel credit manger and the second channel credit manager can read from the credit pool limit register.

8. The circuit of claim 7, wherein the first channel credit manager reads the credit pool value and the credit pool limit value, wherein the first channel credit manager compares the credit pool value with the credit pool limit value, and wherein the first channel credit manager outputs a minipacket flow control signal indicating that an additional minipacket is allowed to be transmitted via the first channel when the credit pool value is greater than the credit pool limit.

9. The circuit of claim 7, wherein the circuit further comprises:
   a processor; and
   a command bus, wherein the processor writes the credit pool value to the credit pool register via the command bus, and wherein the processor writes the credit limit value to the credit limit register via the command bus.

10. The circuit of claim 1, wherein the scheduler circuit, the traffic manager interface circuit, and the physical network interface circuit are included in an Island-Based Network Flow Processor (IB-NFP), wherein the scheduler circuit and the traffic manager interface circuit are included in a first island, wherein the physical network interface circuit is included in a second island within the IB-NFP, and wherein the physical network interface circuit is a MAC island.

11. A method, comprising:
(a) routing a minipacket to a first channel;
(b) updating a current credit counter value associated with the first channel in response to (a);
(c) comparing the current credit counter value with a credit limit value;
(d) outputting a minipacket flow control signal indicating that an additional minipacket is allowed to be transmitted via the first channel when the current credit counter value is greater than the credit limit value; and
(e) outputting a minipacket flow control signal indicating that an additional minipacket is not allowed to be transmitted via the first channel when the current credit counter value is not greater than the credit limit value, wherein the updating of (b) further comprises:
(b1) counting the amount of data transmitted via the first channel;
(b2) comparing the amount of data with a data threshold value;
(b3) outputting a decrement credit counter signal when the amount of data is greater than the data threshold value;
(b4) decrementing the current credit counter signal when the decrement credit counter signal is output; and
(b5) not decrementing the current credit counter signal when the decrement credit counter signal is not output.

12. The method of claim 11, wherein the minipacket is received from a packet modifier circuit, and wherein a scheduler circuit receives the minipacket flow control signal.

13. The method of claim 11, wherein the updating of (b) further comprises:
receiving a credit adjustment value; and
adding the credit adjustment value to the credit counter value, wherein the credit adjustment value is either a positive or negative value.

14. The method of claim 13, wherein the credit adjustment value is received from a Media Access Control (MAC) circuit, wherein the MAC circuit generates the credit adjustment value in response to transmitting data communicated to the MAC circuit via the first channel, and wherein the minipacket includes a full packet.

15. The method of claim 11, wherein the minipacket flow control signal output in (d) is output to a scheduler circuit that controls if an additional minipacket is to be transmitted via the first channel, wherein the first channel transmits the minipacket to a Media Access Control (MAC) circuit, and wherein the minipacket includes a portion of a full packet.

16. A method, comprising:
(a) receiving a minipacket onto a first channel;
(b) updating a current credit value associated with the first channel in response to (a);
(c) reading a credit limit value, a credit pool value, and a credit pool limit;
(d) comparing the current credit value with a credit limit value;
(e) comparing the credit pool value with the credit pool limit;
(f) outputting a minipacket flow control signal indicating that an additional minipacket is allowed to be transmitted via the first channel when either: (i) the current credit value is greater than the credit limit value, or (ii) the credit pool value is greater than the credit pool limit; and
(e) outputting a minipacket flow control signal indicating that an additional minipacket is not allowed to be transmitted via the first channel when both (i) the current credit value is not greater than the credit limit value, and (ii) the credit pool value is not greater than the credit pool limit.

17. The method of claim 16, wherein the credit pool value is read from a credit pool register, wherein the credit pool limit is read from a credit pool limit register, wherein the credit limit value is read from a credit limit register, and wherein the registers are programmable by a processor across a command bus.

18. The method of claim 16, wherein (a) through (e) are performed by a traffic manger interface circuit, wherein the traffic manager interface circuit does not include a processor that fetches instructions, and wherein the traffic manager interface circuit is part of a Island-Based Network Flow Processor (IB-NFP).

* * * * *